United States Patent
Hashimoto

(10) Patent No.: US 11,704,698 B1
(45) Date of Patent: Jul. 18, 2023

(54) VEHICLE ADVERTISING SYSTEM AND METHOD OF USING

(71) Applicant: Woven by Toyota, Inc., Tokyo (JP)

(72) Inventor: Daisuke Hashimoto, Chofu (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 0 days.

(21) Appl. No.: 17/707,871

(22) Filed: Mar. 29, 2022

(51) Int. Cl.
G06Q 30/00 (2023.01)
G06Q 30/0251 (2023.01)
G06Q 30/0242 (2023.01)

(52) U.S. Cl.
CPC ..... *G06Q 30/0266* (2013.01); *G06Q 30/0242* (2013.01)

(58) Field of Classification Search
None
See application file for complete search history.

(56) References Cited

U.S. PATENT DOCUMENTS

| 10,665,155 | B1 * | 5/2020 | Rao .................... G06Q 30/0242 |
| 11,138,451 | B2 | 10/2021 | Takeyasu et al. |
| 2002/0065046 | A1 * | 5/2002 | Mankins ................ G08G 1/01 455/456.1 |
| 2008/0215415 | A1 * | 9/2008 | Willms .................. G06Q 30/02 705/14.43 |
| 2014/0078282 | A1 | 3/2014 | Aoki et al. |
| 2015/0006278 | A1 * | 1/2015 | Di Censo ............. G06V 20/597 705/14.43 |
| 2016/0012472 | A1 * | 1/2016 | Nagaswami ....... G06Q 30/0265 705/14.62 |
| 2019/0205937 | A1 | 7/2019 | Tamaguchi et al. |

(Continued)

FOREIGN PATENT DOCUMENTS

| DE | 102014109079 A1 * | 12/2014 | ......... G06K 9/00845 |
| KR | 20210100731 A * | 8/2021 | ......... G06Q 30/0272 |
| WO | WO-2016014966 A2 * | 1/2016 | ........... B60Q 1/2619 |

OTHER PUBLICATIONS

Bahnsen, Robert Bruce, and Yan Mayster. "Contextually-Relevant Vehicle Advertising." (2021). (Year: 2021).*

(Continued)

*Primary Examiner* — Michael Bekerman
(74) *Attorney, Agent, or Firm* — Hauptman Ham, LLP

(57) ABSTRACT

A mobile advertising system includes a non-transitory computer readable configured to store instructions thereon; and a processor connected to the non-transitory computer readable medium. The processor is configured to execute the instructions for receiving gaze data from a viewing vehicle. The processor is configured to execute the instructions for receiving location information from an advertising vehicle. The processor is configured to execute the instructions for correlating the gaze data with the location information to determine whether the gaze data indicates viewing of an advertisement attached to the advertising vehicle. The processor is configured to execute the instructions for updating a histogram based on the correlation between the gaze data and the location information. The processor is configured to execute the instructions for generating a travel plan for increasing advertising effectiveness for the advertisement. The processor is configured to execute the instructions for transmitting the travel plan to the advertising vehicle.

20 Claims, 12 Drawing Sheets

(56) References Cited

U.S. PATENT DOCUMENTS

| | | | |
|---|---|---|---|
| 2019/0268743 A1* | 8/2019 | Cho | G06Q 30/0265 |
| 2019/0303759 A1 | 10/2019 | Farabet et al. | |
| 2020/0064912 A1* | 2/2020 | Melatti | G06F 3/013 |
| 2020/0098007 A1 | 3/2020 | Sakurada et al. | |
| 2020/0104881 A1* | 4/2020 | Yasui | G06Q 50/30 |
| 2020/0223454 A1* | 7/2020 | Fox | B60W 60/00139 |
| 2021/0125227 A1* | 4/2021 | Lee | B60W 60/001 |
| 2021/0233115 A1* | 7/2021 | Kardesler | H04W 4/027 |
| 2021/0370954 A1* | 12/2021 | Alvarez | G06Q 30/0242 |
| 2021/0382379 A1* | 12/2021 | Lachaumette | B60Q 1/50 |
| 2022/0244064 A1* | 8/2022 | Futamura | G06Q 30/0205 |

OTHER PUBLICATIONS

Lee, Byoungduk, et al. "Location Responsive Vehicle Digital Signage System for Visual Mobile Advertisement." Journal of Satellite, Information and Communications 12.1 (2017): 49-53. (Year: 2017).*

Zhang et al., "It's Written All Over Your Face: Full-Face Appearance-Based Gaze Estimation", 2017, IEEE, 10pp.

Zhang et al., "Appearance-Based Gaze Estimation in the Wild", 2015, IEEE, 10pp.

* cited by examiner

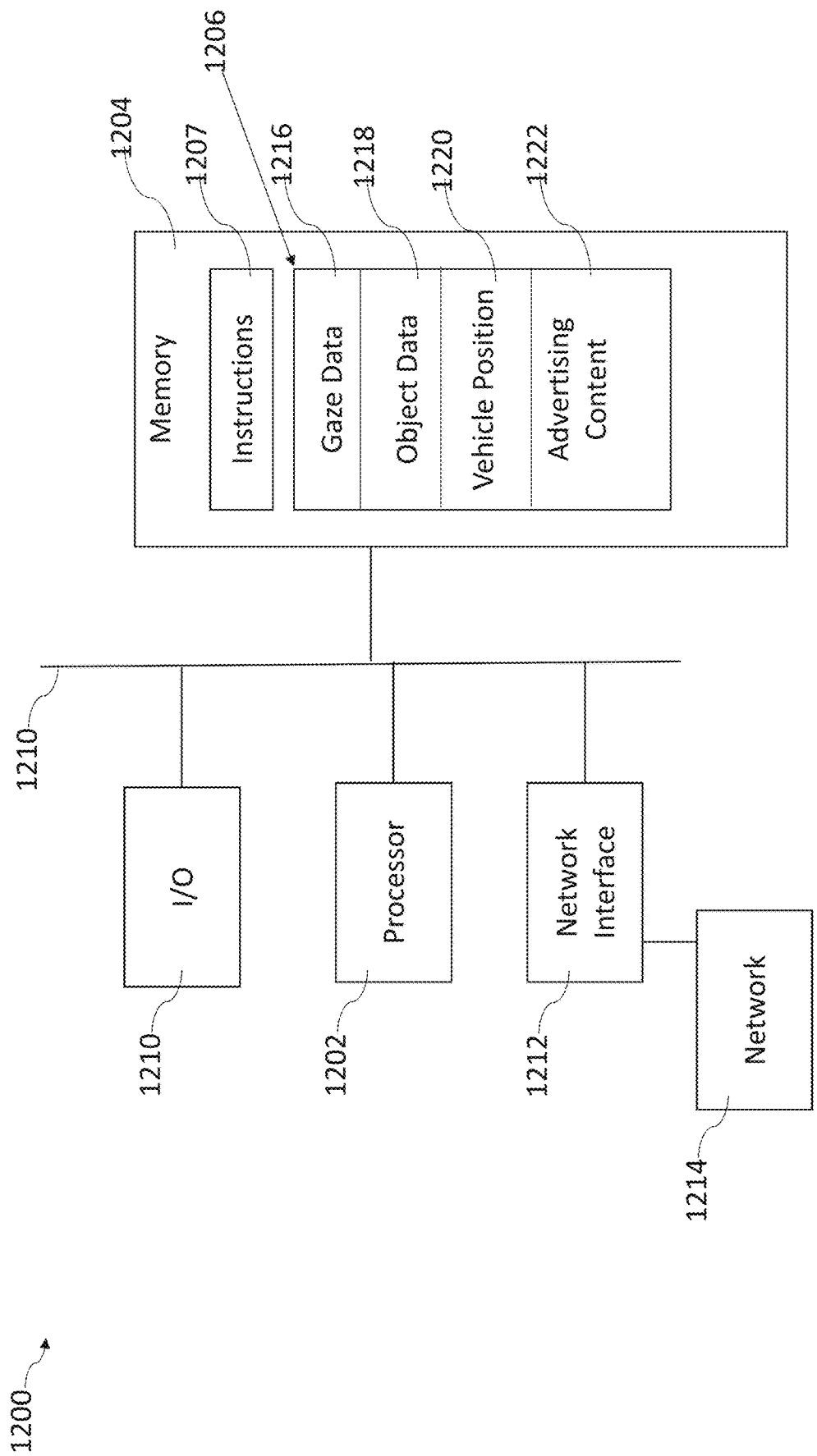

VEHICLE ADVERTISING SYSTEM AND METHOD OF USING

RELATED APPLICATIONS

This application is related to U.S. application Ser. No. 17/497,846, filed Oct. 8, 2021, which is hereby incorporated by reference in its entirety.

BACKGROUND

Advertisements are located on signage around roadways at many locations. Recently, advertisements are also located on vehicles that move along roadways and other transit lines. Prices for different advertising locations vary based on assumed amount of visibility of the advertisement. The goal for the advertisers is to have vehicle occupants, such as a driver, view the advertisement and purchase the advertised product or service.

In some instances, electronic signs, either stationary or vehicle-mounted, periodically change to display different advertisements at different times. As a result, multiple advertisements are able to be displayed at a same location using the electronic signs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 12 is a diagram of a system for implementing a vehicle advertising system, in accordance with some embodiments.

DETAILED DESCRIPTION

Figure 1:
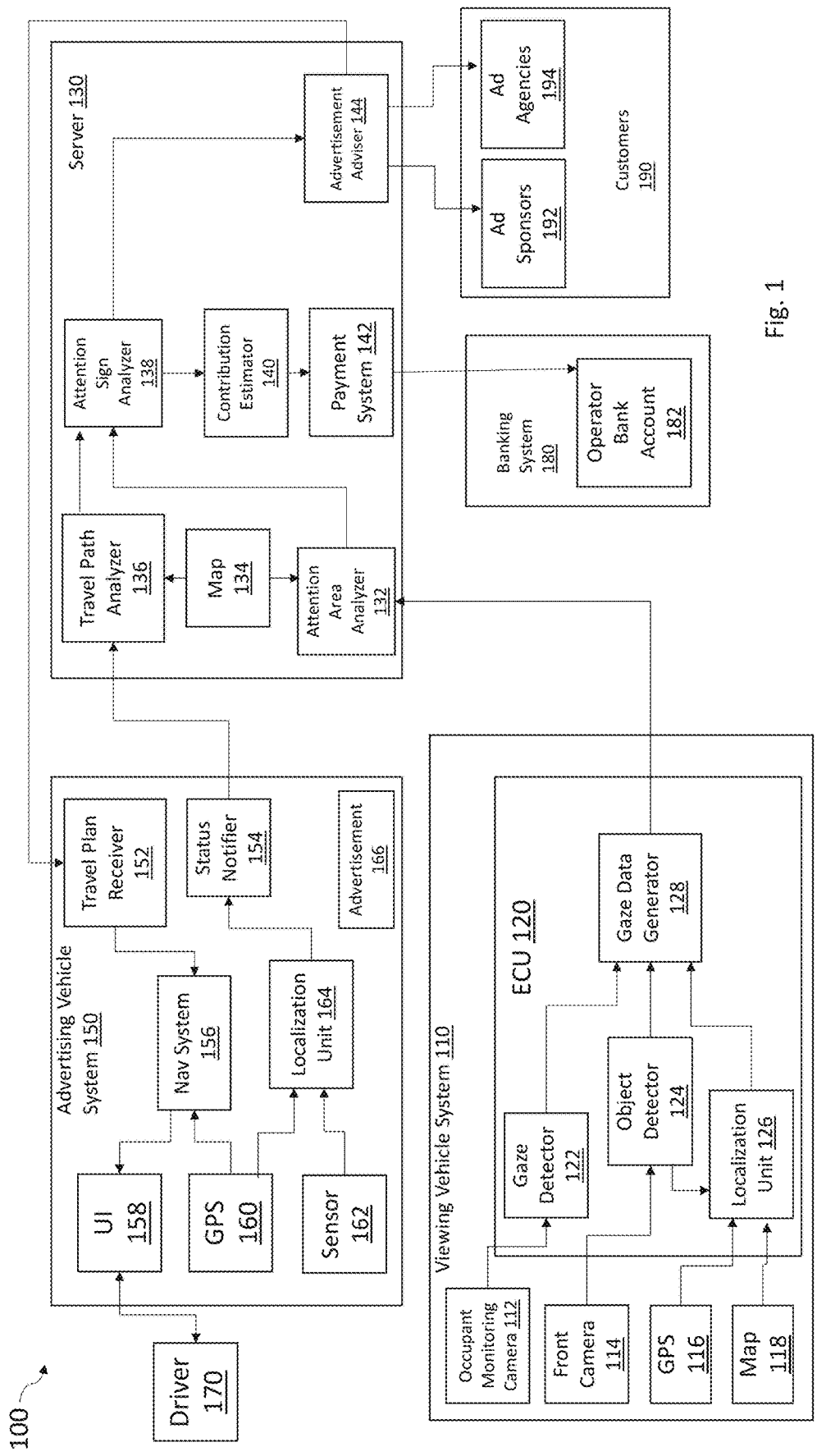
FIG. 1 is a block diagram of a mobile advertising system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Recently, advertisers have sought to expand advertising campaigns to include advertisements as part of moving vehicles, such as automobiles, trucks, trains or even airplanes. Vehicle operators are able to secure one or more advertisements to a vehicle. In some embodiments, the advertisements are secured in a removable fashion, such as using magnets, suction cups, static sticker, temporary adhesive, or other suitable removable attachment options. In some embodiments, the advertisements are secured in a non-removable fashion, such as using a permanent adhesive, rivets, or other suitable permanent attachment options. In some embodiments, the advertisement is able to change a product or service being advertised, such as using an electronic sign. In some embodiments, multiple advertisements are secured to a same vehicle. For example, in some embodiments, a first advertisement is on a driver's side of a vehicle and a second advertisement is on a rear window of the vehicle. In some embodiments, each of the multiple advertisements are for a same product or service. In some embodiments, at least one of the multiple advertisements is for a different product or service from another one of the multiple products or services.

While advertisers expect that areas with more people are more likely to result in people seeing the advertisement and purchasing the product or service, currently advertisers are unable to accurately determine how often and what type of people are viewing these mobile advertisements. As a result, the advertisers are unable to determine how effective the advertisement is at attracting customers; and the advertiser is unable to determine whether the price of placing the advertisement on the vehicle and a travel path navigated by the vehicle bearing the advertisement is commensurate with the expected customer generation. While signs located on vehicles that travel through areas with a high volume of traffic or people are presumed to be more valuable than advertisements on vehicles that travel along roadways with a lower volume of traffic or people, there is still no reliable measure of how many potential customers are seeing the advertisement. Similarly, travel paths with slower moving traffic are presumed to be more valuable than travel paths with faster moving traffic, but again there is no way to precisely measure whether the advertisement is actually attracting the attention of more potential customers.

In order to provide reliable information for determining whether advertisements are attracting attention of potential customers as well as information about demographics of the potential customers, a vehicle occupant gaze system is utilized in combination with map data and information about the advertising vehicle to determine whether occupants of a viewing vehicle are looking at mobile advertisements. While the following description is described with respect to mobile advertisements on vehicles, one of ordinary skill in the art would understand that the vehicle occupant gaze detection system is applicable to different types of advertising material, such as stationary signs, people carrying signs, displays in store windows, or other such advertisements.

The vehicle occupant gaze detection system captures images of one or more eyes of a vehicle occupant, such as a driver, a front-seat passenger, or a rear-seat passenger. The vehicle occupant gaze detection system utilizes the captured images along with map data, information about the advertising vehicle and/or images from an outward facing detector attached to the vehicle to determine what, if any, mobile advertisements the occupant views and for how long. In some embodiments, the vehicle occupant gaze detection system also collects data on the occupant, such as predicted age, predicted height, predicted weight, hair length, hair color, clothing, etc., in order to estimate a demographic of the occupant. Based on this information, the vehicle occupant gaze detection system is able to generate historical information regarding how many people and what demographic of people are viewing mobile advertisements or paying attention to the travel paths where advertisers could potentially assign drivers for future advertisements to travel. This information usable by the advertiser to determine whether the advertisement is having a desired impact. This information is also usable by leasing agencies or vehicle drivers to help determine appropriate pricing for different advertisements and travel paths.

FIG. 1 is a block diagram of a mobile advertising system 100, in accordance with some embodiments. The description of the mobile advertising system 100 focuses on an automobile controlled by a driver. However, one of ordinary skill in the art would recognize that other vehicles and operators are within the scope of this description, such as a train operated by an engineer or other mobile vehicles. The mobile advertising system 100 includes a viewing vehicle system 110 configured to capture information about an occupant of a viewing vehicle and to generate gaze data. The mobile advertising system 100 further includes a server 130 configured to receive the generated gaze data as well as information about an advertising vehicle and determine which advertisements are viewed by the viewing vehicle occupant and for how long. The mobile advertising system 100 further includes an advertising vehicle system 150 bearing an advertisement. The advertising vehicle system 150 is configured to provide information related to what advertisement is displayed, a location and a travel path of the advertising vehicle to the server 130. The mobile advertisement system 100 further includes a banking system 180 allowing advertisers to pay a driver of the advertising vehicle based on information from the server 130. The mobile advertisement system 100 further includes customers 190 that receive updates regarding effectiveness for an advertisement as well as recommendations for pricing and travel routes.

The viewing vehicle system 110 includes an electronic control unit (ECU) 120 configured to receive data from an occupant monitoring camera 112, a front camera 114, a global positioning system (GPS) 116 and a map 118. The ECU 120 includes a gaze detector 122 configured to receive data from the occupant monitoring camera 112 and detect a gaze direction and/or a gaze depth based on the received data. The ECU 120 further includes an object detector 124 configured to receive data from the front camera 114 and determine a position of any detected objects based on the received data. The ECU 120 further includes a localization unit 126 configured to receive data from the GPS 116, the map 118, the object detector 124 and a road recognizer (not shown in FIG. 1) and determine a position of the viewing vehicle and a pose and state of the viewing vehicle relative to detected and/or known objects and/or road position. A pose is an orientation of the vehicle relative to a reference point, such as a roadway. In some embodiments, the position of the viewing vehicle also refers to a position vector of the viewing vehicle. The pose and state of the viewing vehicle refers to a speed and a heading of the viewing vehicle. In some embodiments, the pose and state of the viewing vehicle also refers to a velocity vector, an acceleration vector and jerk vector of the viewing vehicle. In some embodiments, the position vector, the velocity vector, the acceleration vector and the jerk vector include angle vector. In some embodiments, the state of the viewing vehicle also refers to whether an engine or motor of the viewing vehicle is running. The ECU 120 further includes a gaze data generator 128 configured to receive information from the gaze detector 122, the object detector 124 and the localization unit 126 and to generate gaze data to be transmitted to the server 130.

The occupant monitoring camera 112 is configured to capture images of a driver, or other occupant, of the viewing vehicle. The occupant monitoring camera 112 is connected to the viewing vehicle. In some embodiments, the occupant monitoring camera 112 includes a visible light camera. In some embodiments, the occupant monitoring camera 112 includes an infrared (IR) camera or another suitable sensor. In some embodiments, the occupant monitoring camera 112 is movable relative to the viewing vehicle in order to capture images of at least one eye of an occupant that are different sizes. While capturing images of both eyes of the occupant is preferred, some occupants have only a single eye, and in some instances where a head of the occupant is turned away from the occupant monitoring camera 112, only one of the occupant's eyes is capturable by the occupant monitoring camera 112. In some embodiments, the occupant monitoring camera 112 is adjusted automatically. In some embodiments, the occupant monitoring camera 112 is manual adjustable. In some embodiments, the captured image includes at least one eye of the occupant. In some embodiments, the captured image includes additional information about the occupant, such as approximate height, approximate weight, hair length, hair color, clothing or other suitable information. In some embodiments, the occupant monitoring camera 112 includes multiple image capturing devices for capturing images of different regions of the occupant. In some embodiments, occupant monitoring cameras 112 are located at different locations within the vehicle. For example, in some embodiments, a first occupant monitoring camera 112 is located proximate a rear-view mirror in a central region of the vehicle; and a second occupant monitoring camera 112 is located proximate a driver-side door. One of ordinary skill in the art would recognize that other locations for the occupant monitoring camera 112, which do not interfere with operation of the vehicle, are within the scope of this disclosure. In some embodiments, the data from the occupant monitoring camera 112 includes a time stamp or other metadata to help with synchronization with other data.

One of ordinary skill in the art would understand that in some embodiments the viewing vehicle system 110 includes additional cameras for monitoring multiple occupants. Each of the additional cameras are similar to the occupant monitoring camera 112 described above. For example, in some embodiments, one or more monitoring cameras are positioned in the vehicle for capturing images of at least one eye of a front-seat passenger. In some embodiments, one or more monitoring cameras are positioned in the vehicle for capturing images of at least one eye of a rear-seat passenger. In some embodiments, the additional cameras are only activated in response to the vehicle detecting a corresponding front-seat passenger or rear-seat passenger. In some embodiments, an operator of the vehicle is able to selectively de-activate the additional cameras. In embodiments including additional cameras, the captured images are still sent to the gaze detector 122; and the gaze detector 122 is able to generate a gaze result for each of the monitored occupants of the vehicle.

The front camera 114 is configured to capture images of an environment surrounding the viewing vehicle. In some embodiments, the front camera 114 includes a visible light camera, an IR camera. In some embodiments, the front camera 114 is replaced with or is further accompanied by a light detection and ranging (LiDAR) sensor, a radio detection and ranging (RADAR) sensor, a sound navigation and ranging (SONAR) sensor or another suitable sensor. In some embodiments, the front camera 114 includes additional cameras located at other locations on the vehicle. For example, in some embodiments, additional cameras are located on sides of the vehicle in order to detect a larger portion of the environment to the left and right of the viewing vehicle. Since viewing vehicle occupants are able to look out of side windows of the vehicle, using additional cameras to detect a larger portion of the environment surrounding the viewing vehicle helps to increase precision of determining objects being viewed by the occupants of the viewing vehicle. For example, in some embodiments, additional cameras are located on a back side of the viewing vehicle in order to detect a larger portion of the environment to a rear of the viewing vehicle. This information helps to capture additional objects that viewing vehicle occupants other than the driver are able to view out of rear window. The front camera 114 is also able to capture images for determining whether any obstructions, such as medians or guard rails, are present between a location of an object, such as an advertising vehicle, and the occupants of the viewing vehicle. In some embodiments, the data from the front camera 114 includes a time stamp or other metadata in order to help synchronize the data from the front camera 114 with the data from the occupant monitoring camera 112.

The GPS 116 is configured to determine a location of the viewing vehicle. Knowing the location of the viewing vehicle helps to relate the object and the direction that drew the attention of the occupants with the objects and areas that are related to determined locations of advertising vehicles on the map 118. Knowing the heading of the viewing vehicle helps to predict which direction an occupant of the viewing vehicle is looking in order to assist with generation of gaze data. Knowing a speed of the viewing vehicle helps to determine how long an occupant of the viewing vehicle had an opportunity to view a mobile advertisement. For example, there are cases that an occupant determined to be viewing a mobile advertisement for two seconds (2 s) in a slow-moving viewing vehicle is determined to have less interest in the advertised product or service than an occupant determined to be viewing the mobile advertisement for 2 s in a fast-moving viewing vehicle. By accounting for the speed of the vehicle in determining interest, false positive interest is reduced or avoided. For example, a person sitting in a traffic jam may be gazing out the window, but not actually be very interested in the advertisement. On the contrary, a person in a vehicle moving at high speed taking the time to view the advertisement suggests a higher level of interest in the advertisement.

The map 118 includes information related to the roadway and known objects along the roadway. In some embodiments, the map 118 is usable in conjunction with the GPS 116 to determine a location and a heading of the viewing vehicle. In some embodiments, the map 118 is received from an external device, such as the server 130. In some embodiments, the map 118 is periodically updated based on information from the front camera 114 and/or the GPS 116. In some embodiments, the map 118 is periodically updated based on information received from the external device. In some embodiments, the map 118 is generated from sensor data by simultaneous localization and mapping (SLAM) algorithm.

The following description will focus primarily on analysis of information related to the driver for the sake of brevity. One of ordinary skill in the art would understand that the description is applicable to other occupants, such as front-seat passengers or rear-seat passengers, of the vehicle as well.

The gaze detector 122 is configured to receive data from the driver monitoring camera 112 and generate a detected gaze result. The detected gaze result includes a direction that the eyes of the driver are looking. In some embodiments, the direction includes an azimuth angle and an elevation angle. Including azimuth angle and elevation angle allows a determination of a direction that the driver is looking both parallel to a horizon and perpendicular to the horizon. In some embodiments, the detected gaze result further includes depth information. Depth information is an estimated distance from the driver that visual axes of the driver's eyes converge. Including depth information allows a determination of a distance between the driver and an object on which the driver is focusing a gaze. Combining depth information along with azimuth angle and elevation angle increases a precision of the detected gaze result. In some embodiments where the captured image includes only a single eye of the driver, the determining depth information is difficult, so only azimuth angle and elevation angle are determined by the gaze detector 122. In some embodiments, the detected gaze result further includes the variances of the azimuth angle, the elevation angle and the depth information, so that the probability distribution of the region that the driver paid attention to is able to be estimated. In some embodiments, the precision of the detected gaze result is further increased by applying a probabilistic filter, such as Kalman filter, to the time series of the probability distributions. In some embodiments, the gaze detector 122 is further configured to receive data from the front camera 114 and to associate the detected gaze with a pixel location of an image from the front camera 114 based on the azimuth angle and elevation angle.

In some embodiments, the gaze detector 122 is not attached to the viewing vehicle. In some embodiments, the gaze detector 122 is attached to the occupant of the viewing vehicle. For example, in some embodiments, the gaze detector 122 includes smart glasses, another piece of smart clothing or other such device that is capable of determining gaze information of a wearer. In some embodiments that utilize smart glasses, gaze data is able to be collected from pedestrians, people riding bicycles or other people that are not in a vehicle. The mobile advertising system 100 is able to utilize this gaze data in order to help determine the effectiveness of the mobile advertisement.

The object detector 124 is configured to receive data from the front camera 114 as well as any additional sensors for detecting an environment surrounding the viewing vehicle. Based on the received data, the object detector 124 identifies objects in the surrounding environment. In some embodiments, the object detector 124 is further configured to receive data from the GPS 116 and/or the map 118 to help with identification of objects based on a location of the viewing vehicle from the GPS 116 and location of known objects from the map 118. Using the GPS 116 and map 118 information helps to reduce processing load on the object detector 124. In some embodiments, the object detector 124 is further configured to identify a type of object, such as another vehicle, a pedestrian, a road sign, an advertising sign, an advertising sign on an advertising vehicle, a building, etc. One of ordinary skill in the art would understand that this disclosure is also applicable to determine what, if any, mobile advertisements, such as on trucks or buses, occupants of the vehicle are attracted to. In order to determine whether mobile advertisements are present, camera images are analyzed, in some embodiments. In some embodiments, location information for the mobile advertisements is combined with data from the advertising vehicle to determine whether the occupant was observing the mobile advertisement. In some embodiments, an advertising vehicle that the advertising signs are attached to will periodically transmit the location information of the advertising vehicle to the server 130, and the location information of the advertising vehicle is mapped to the gaze data at server 130. In some embodiments, the object detector 124 outputs the received data from the front camera 114 and/or from the additional sensors to the gaze data generator 128 and/or localization unit 126.

The localization unit 126 is configured to receive information from the object detector 124, the GPS 116 and the map 118 and determining a location of the viewing vehicle in the world coordinate system or a location of the viewing vehicle relative to the objects on the map 118 and objects detected by the object detector 124. In some embodiments, the localization unit 126 is usable to determine a heading and a speed of the viewing vehicle. The localization unit 126 is also configured to determine state information for the viewing vehicle. In some embodiments, the state information includes speed of the viewing vehicle. In some embodiments, the state information includes velocity vector of the viewing vehicle. In some embodiments, the state information includes heading of the viewing vehicle. In some embodiments, the state information includes acceleration vector of the viewing vehicle. In some embodiments, the state information includes jerk vector of the viewing vehicle. In some embodiments, the state information includes whether an engine or motor of the viewing vehicle is running. In some embodiments, the state information includes other status information related to the viewing vehicle, such as operation of wind shield wipers, etc.

The gaze data generator 128 is configured to receive the detected gaze result from the gaze detector 122, object detection information from the object detector 124, and vehicle position and state information from the localization unit 126. The gaze data generator 128 detects lines along which the driver's gaze was directed and generates gaze data based on these detected lines. One of ordinary skill in the art would understand that lines of the driver's gaze refer to rays or half-lines indicating a direction from a point of the eye of the driver that the driver is looking toward. The gaze data includes time stamp information, vehicle information of the viewing vehicle system 110, position of the viewing vehicle, and gaze angles of the driver relative to the viewing vehicle. In some embodiments, the gaze data generator 128 is configured to determine what, if any, mobile advertisements are visible to the driver. In some embodiments, the gaze data generator 128 is configured to identify any known objects from the map 118, which are obstructed by other objects that would prevent the driver from seeing the mobile advertisement. These obstructed objects are identified, so that these objects are able to be excluded from consideration during generation of the gaze data. In some embodiments, the gaze data generator 128 further links the gaze data with locations of objects from either the object detector 124 and/or the localization unit 126. In some embodiments, the gaze data generator 128 excludes any gaze data related to mobile advertisements that are determined as being obstructed based on information from the object detector 124 and the localization unit 126. In some embodiments, an obstruction threshold, such as 50% of an area of the mobile advertisement is obscured, is used by the gaze data generator 128 to determine whether to exclude gaze data related to obstructed mobile advertisement.

In some embodiments, the gaze data generator 128 is further configured to include at least one image of the driver in the gaze data to permit demographic analysis of the driver based on the captured image. In some embodiments, the gaze data generator 128 is configured to include driver identification data, such as an identification number of the driver, with the gaze data to permit demographic analysis of the driver. In some embodiments, the driver identification data is received based on ownership or rental information stored in the ECU 120.

The gaze data generator 128 outputs the gaze data to be transmitted to the server 130. In some embodiments, the viewing vehicle system 110 transmits the gaze data to the server 130 wirelessly. In some embodiments, the viewing vehicle system 110 transmits the gaze data to the server 130 via a wired connection. In some embodiments, the gaze data generator 128 is configured to transmit advertising vehicle identification information, such as a license plate or other identifying information, to the server 130 to allow the server 130 to accurately associate the gaze data with the correct advertising vehicle.

The server 130 includes a map 134. The server 130 further includes an attention area analyzer 132 configured to receive the gaze data from the viewing vehicle system 110. The attention area analyzer 132 is further configured to receive information from the map 134. The attention arear analyzer 132 is configured to receive and format the gaze data. The gaze data is then correlated to information from the map 134 to determine where the gaze data indicates that the occupant of the viewing vehicle was looking. The server 130 further includes a travel path analyzer 136 configured to receive advertising vehicle information from the advertising vehicle system 150. The advertising vehicle information includes information, such as which advertisement is being displayed by the advertising vehicle, advertising vehicle position, advertising vehicle velocity, advertising vehicle pose, or other suitable information about the advertising vehicle. The travel path analyzer is configured to combine the advertising vehicle information with the map 134. The server 130 further includes an attention sign analyzer 138 configured to receive information from the attention area analyzer 132 and the travel path analyzer 136 to determine whether the occupant of the viewing vehicle is look at an advertisement on the advertising vehicle; and if so, then what advertisement and for how long. The server 130 further includes a contribution estimator 140 configured to receive information related to occupants of viewing vehicles viewing advertisements on the advertising vehicle. The contribution estimator 140 is configured to determine how an amount of viewed time each advertisement on the advertising vehicle has been viewed in order to determine the effectiveness of the advertising vehicle. The server 130 further includes a payment system 142 configured to pay the operator of the advertising vehicle based on the information from the contribution estimator 140.

In some embodiments, the server 130 further includes a memory unit configured to store the correlation between the gaze data and the map 134 and a histogram generated based on the correlation between the gaze data and the map 134. This histogram associates the correlation between the gaze data and the map 134 with additional data, such as date, time, demographic data, or other suitable information. The server 130 further includes an advertisement adviser 144 configured to receive information from the attention sign analyzer 138. The advertisement adviser 144 is configured to analyze the information from the attention sign analyzer 138 and determine what type of person is viewing a mobile advertisement, when and for how long. The advertisement adviser 144 is further configured to provide updated or new travel plans to an advertising vehicle in order to improve effectiveness of the advertising vehicle in obtaining views of the advertisements displayed thereon.

The map 134 includes information related to the roadway and known objects along the roadway. In some embodiments, the map 134 includes additional information other than roadways, such as train tracks or other suitable information. In some embodiments, the map 134 further includes information related to traffic lights, such as positions and lighting schedules, that potentially affects the stopping time of the advertising vehicle system 150. In some embodiments, the map 134 further includes information of traffic signs, such as stop signs, that potentially affect the stopping time of the advertising vehicle system 150. In some embodiments, the map 134 is the same as map 118. In some embodiments, the map 134 has higher definition than map 118. In some embodiments, the map 134 is received from an external device. In some embodiments, the map 134 is periodically transmitted to the viewing vehicle system 110 for updating map 118. In some embodiments, the map 134 is periodically updated based on updated information received by the server 130.

The attention area analyzer 132 is configured to correlate the received gaze data with the map 134 in order to determine which locations on the driver directed the gaze toward. In some embodiments, this correlation is stored as a correlation between the gaze data and the map 134 based on a plurality of lattice points. Each lattice point includes positional information related to positional coordinates, e.g., X, Y and Z, as well as azimuth angle and elevation angle. Each lattice point also includes information related to how long the driver's gaze fell within the areas defined by the positional information. In some embodiments, the positional information for the correlation between the gaze data and the map 134 is determined based on known objects from the map 134 and/or detected objects in the gaze data. In some embodiments, only lattice points having a gaze duration above a threshold are included in the correlation between the gaze data and the map 134. In some embodiments, the threshold is adjusted based on state of the vehicle information from the localization unit 126. For example, in some embodiments, as a speed of a vehicle increases, the threshold gaze duration decreases to account for less time that a mobile advertisement would be within a potential field of view of the driver. Once the correlation between the gaze data and the map 134 is generated the correlation between the gaze data and the map 134 is stored in the memory unit. In some embodiments, the correlation between the gaze data and the map 134 is separately available for display at a request of a user, such as advertising sponsors 192 or advertisement agencies 194. In some embodiments, the correlation between the gaze data and the map 134 is customizable to include only lattice points associated with a specified user, such as the advertising sponsors 192 or the advertisement agencies 194. In some embodiments, the correlation between the gaze data and the map 134 is customizable to include only lattice points of selected users. In some embodiments, the selected users include competitor companies for the advertising sponsors 192.

In some embodiments, the lattice points are used to generate a gridmap to visualize the correlation between the received gaze data and the map 134. In some embodiments, status information for a point of the gridmap 50 is determined based on known objects from the map 134 and/or detected objects in the gaze data. Once the gridmap 50 is generated the gridmap 50 is stored in the memory unit. As additional gaze data is received by the server 130, the gridmap 50 is able to be updated to include new lattice points or update information associated with already existing lattice points. Updating a gridmap 50 includes updating status information for at least one point within the gridmap 50. For example, as a vehicle moves relative to other objects, a positional relationship between the vehicle and the other objects changes. This causes changes in the status information at various points of the gridmap 50.

As additional gaze data is received by the server 130, the correlation between the gaze data and the map 134 is able to be updated to include new lattice points or update information associated with already existing lattice points. In some embodiments, the attention area analyzer 132 is configured to generate the correlation between the gaze data and the map 134 for a single viewing vehicle. In some embodiments, the attention area analyzer 132 is configured to generate the correlation between the gaze data and the map 134 for multiple viewing vehicles. In some embodiments, the attention area analyzer 132 is configured to generate the correlation between the gaze data and the map 134 for a predetermined geographic area defined by the map 134. In some embodiments, the attention area analyzer 132 is configured to generate and manage a plurality of correlation, such as a first correlation for a first geographical region, a second correlation for a second geographical region, and a third correlation for a specific set of viewing vehicles.

In some embodiments, the server 130 includes a memory unit configured to store the correlation between the gaze data and the map 134 and the histogram. In some embodiments, the memory unit is further configured to store additional information such as the gaze data and the map 134. In some embodiments, the memory unit includes a solid-state memory device. In some embodiments, the memory unit includes a dynamic random-access memory (DRAM). In some embodiments, the memory unit includes a non-volatile memory device. In some embodiments, the memory unit includes cloud-based storage or another suitable storage structure.

The travel path analyzer 136 is configured to receive position and vehicle information for an advertising vehicle from the advertising vehicle system 150. The travel path analyzer 136 is configured to determine trajectory of the advertising vehicle relative to the map 134 at different points in time. In some embodiments, the trajectory includes the locations that the vehicle has passed through in the past. In some embodiments, the trajectory includes the predicted trajectory through which the vehicle is going to pass. In some embodiments, travel path analyzer 136 is configured to determine the trajectory of the advertising vehicle in real-time. In some embodiments, the travel path analyzer 136 is configured to determine a travel path that the advertising vehicle has at least partially completed. In some embodiments, the travel path analyzer 136 is configured to periodically receive information related to the advertising vehicle, so determination of the trajectory of the advertising vehicle is performed on a periodic basis.

The attention sign analyzer 138 is configured to correlate the trajectory of the advertising vehicle at various points in time with the information, such as the correlation between the gaze data and the map 134, generated by the attention area analyzer 132. Based on the correlation, the attention sign analyzer 138 is configured to generate a histogram to determine effectiveness of a mobile advertisement. In some embodiments, the attention sign analyzer 138 generates the histogram based on time of day, weather conditions, sign location, sign angle relative to a vehicle heading, demographic information, or other suitable criteria. In some embodiments, the demographic information is based on driver identification information associated with log entries in the lattice points of the correlation between the gaze data and the map 134. In some embodiments, the demographic information is extracted based on characteristics of the driver from a captured image associated with log entries in the lattice points of the correlation between the gaze data and the map 134. For example, if the captured image of a driver indicates a person with facial hair, the driver is determined to be male, in some instances. Other physical characteristics are usable to determine other demographical information. In some embodiments, a trained neural network is usable to extract demographical information based on the captured image. In some embodiments, the attention sign analyzer 138 is configured to generate the histogram for a single viewing vehicle. In some embodiments, the attention sign analyzer 138 is configured to generate the histogram for multiple viewing vehicles. In some embodiments, the attention sign analyzer 138 is configured to generate the histogram for a predetermined geographic area. In some embodiments, the attention sign analyzer 138 is configured to generate multiple histograms, such as a first histogram for a first geographical region, a second histogram for a second geographical region, and a third histogram for a specific set of vehicles. In some embodiments, the attention sign analyzer 138 continues to update the histogram as new correlations between the gaze data and the map 134 data is available. In some embodiments, the attention sign analyzer 138 is configured to generate a new histogram based on requested parameters received from the customers 190. In some embodiments, the histogram includes information on which drivers of advertising vehicles 150 attracted how much attention. In some embodiments, the histogram include information on which type of cars attracted the most attention and how much attention is attracted.

In some embodiments, an advertising vehicle includes more than one advertisement attached to the vehicle. In order to determine which advertisement attracted the gaze of the occupant of the viewing vehicle, the attention sign analyzer 138 is configured to determine which area of the advertising vehicle the occupant's gaze was directed towards. The correlation between the gaze data and the map 134 is combined with the advertising vehicle information in order to identify an area of the advertising vehicle that attracted the occupant's gaze. The information related to the advertising vehicle is then used to determine which advertisement was located at the viewed area of the advertising vehicle. In some embodiments, the advertisement at the viewed area of the advertising vehicle is determined based on information received from the viewing vehicle system 110, such as an image from the front camera 114.

The contribution estimator 140 uses the histogram generated by the attention sign analyzer 138 in order to determine a number of views for each advertisement attached to the advertising vehicle. Based on the number of views for each advertisement, the contribution estimator 140 is able to determine an amount of payment to be paid to the operator of the advertising vehicle. In some embodiments, the amount of payment is determined based purely on a number of views. In some embodiments, the amount of payment is determined based on additional factors, such as a viewer being within a target demographic, a time of day of a viewing, duration of viewing of the advertisement, a location where views of the advertisement were detected, or other suitable additional factors. A person in a target demographic that sees an advertisement is more likely to be a customer than a person that is not within the target demographic. Therefore, in some embodiments, a detected viewing by a person in a target demographic has a higher payment amount in comparison with a detected viewing by a person that is not in the target demographic. A time of day of the viewing is likely to impact the odds of a purchase. For example, an advertisement for a restaurant viewed near mealtime is more likely to result in patronage of the restaurant then an advertisement for a restaurant viewed at a time other than mealtime. Therefore, in some embodiments, a timing of a detected viewing alters an amount of a payment to the operator of the advertising vehicle. As a person views an advertisement for longer, the odds of a purchase also increase. Therefore, in some embodiments, a length of time of a detected viewing of an advertisement increases the amount of the payment. An advertisement viewed at a location close to the business being advertised is more likely to result in the person visiting the advertised business. Therefore, in some embodiments, an amount of the payment increases as proximity to the advertised business increases.

The payment system 142 is configured to receive the payment amount from contribution estimator 140 and transfer funds to a bank account of an operator of the advertising vehicle based on the payment amount. In some embodiments, the payment system 142 has access to an account controllable by one of the customers 190 or by a third part intermediary. The payment system 142 is configured to transfer money from the account of the customers 190 or third party to the account of the operator of the advertising vehicle. In some embodiments, the account of the operator is the account of a driver of the advertising vehicle. In some embodiments, the account of the operator is the account of a company for which the driver works. In some embodiments, the funds are transferred based on a wireless signal. In some embodiments, the funds are transferred based on a signal received through a wired connection.

The advertisement adviser 144 is configured to receive the histogram and extract information to determine which mobile advertisements are viewed most and/or longest. Obtaining information related to areas where the occupants of the vehicle direct attention helps to identify locations for future advertisements. The advertisement adviser 144 is configured to provide the extracted information to customers 190. In some embodiments, the advertisement adviser 144 is configured to receive data requests from the customers 190 and extract information from the histogram based on the received data requests. In some embodiments, the data request includes information about types of product or services on specific signs, travel paths that generate the most views, areas of the advertising vehicle viewed most often, or other criteria. The advertisement adviser 144 extracts information to identify demographics of people that showed interest in the corresponding product or service. In some embodiments, the product or service on the sign is extracted based on data captured by the front camera 114.

In some embodiments, the mobile advertisement includes an electronic sign that changes advertisements periodically. In some embodiments, the advertisement adviser 144 associates time stamp information from the histogram with an advertisement displayed on the electronic sign during the corresponding time stamp in order to determine which advertisement attracted the attention of the occupant of the viewing vehicle.

The advertisement advisor 144 outputs the histogram information to be transmitted to the customers 190. In some embodiments, the server 130 transmits the histogram information to the customers 190 wirelessly. In some embodiments, the server 130 transmits the histogram information to the customers 190 via a wired connection. In some embodiments, the server 130 instructions a printer to print the histogram information, and the printed information is provided to the customers 190.

The advertising vehicle system 150 is configured to provide information to a driver 170 for prompting the driver 170 to operate the advertising vehicle in a manner to increase effectiveness of the mobile advertising. The advertising vehicle system 150 includes a travel plan receiver 152 configured to receive a suggested travel plan from the advertisement adviser 144 of the server 130. The advertising vehicle system 150 further includes a status notifier 154 configured to transmit advertising vehicle information to the server 130. The advertising vehicle system 150 further includes a navigation system 156 configured to receive the recommended travel plan from the travel plan receiver 152 and map and positioning information from a global position system (GPS) 160. The advertising vehicle system 150 further includes a user interface (UI) 158 configured to provide information to the driver 170 and to receive input information from the driver 170. The advertising vehicle system 150 further includes a GPS configured to provide map and positioning information to the navigation system 156 and a localization unit 164. The advertising vehicle system 150 further includes a sensor 162 configured to detect surroundings of the advertising vehicle. The localization unit 164 is configured to determine the location and pose of the advertising vehicle based on information from the GPS 160 and the sensor 162. The advertising vehicle system 150 further includes information related to an advertisement 166 being displayed by the advertising vehicle. In some embodiments, the information for the advertisement 166 is stored in a memory. In some embodiments, the information for the advertisement 166 is received from the driver 170 through the UI 158. In some embodiments where the advertising vehicle includes an electronic sign or other adjustable advertisement, the information for the advertisement 166 is updated based on communication with the adjustable advertisement, e.g., using Bluetooth®, WiFi, or other communication protocol.

The travel plan receiver 152 is configured to receive a suggested travel path for the advertising vehicle based on information from the advertisement adviser 144. The suggested travel path is a route recommended by the advertisement advertiser 144. The suggested travel path is determined in order to maximize effectiveness of the advertisement by the advertising vehicle. In some embodiments where the driver has access to multiple advertisements or the advertisement is an adjustable advertisement, the suggested travel path includes information related to recommended advertisements to be displayed on the advertising vehicle. In some embodiments, the advertisement adviser 144 receives information about the advertisement 166 via the status notifier 154.

The status notifier 154 is configured to provide advertising vehicle information to the sever 130. In some embodiments, the advertising vehicle information includes advertising vehicle location, vehicle pose, information on the advertisement 166, identifying information for the advertising vehicle, identifying information for the driver 170, or other suitable information. In some embodiments, the status notifier 154 is configured to provide the advertising vehicle information to the server 130 wirelessly. In some embodiments, the status notifier 154 is configured to provide the advertising vehicle information to the server 130 via a wired connection.

The navigation system 156 is configured to receive the suggested travel path from the travel plan receiver 152 as well as map and location information from the GPS 160 and plan a travel path along roadways to implement the suggested travel path. The navigation system 156 is configured to instruct the UI 158 to display the travel path to the driver 170. In some embodiments, the navigation system 156 is configured to being instructing the driver 170 for executing the travel path in response to receiving approval of the travel path from the driver 170 via the UI 158. In some embodiments where the advertising vehicle has an autonomous drive functionality, the navigation system 156 is configured to provide instructions for the powertrain and steering systems within the advertising vehicle or implementing the travel path in response to receiving approval from the driver 170 via the UI 158. In some embodiments, even if the driver 170 is driving to a certain destination for other purposes than the advertisement, the driver 170 is able to earn advertising revenue on the side in their daily lives by having the navigation system 156 suggest the best route for the most efficient advertising.

The UI 158 is configured to provide information to the driver 170 and to receive instructions from the driver 170. In some embodiments, the UI 158 includes a device integral with the advertising vehicle. In some embodiments, the UI 158 includes a touch screen. In some embodiments, the UI 158 includes a mobile device, such as a smartphone, that is not integral with the advertising vehicle.

The GPS 160 is configured to store information related to maps and roadways. The GPS 160 is configured to receive position information. The GPS 160 is configured to share the map and positional information with the navigation system 156. In some embodiments, the GPS 160 is integrated with the UI 158. In some embodiments, the GPS 160 is separate from the UI 158.

The sensor 162 is configured to capture images of an environment surrounding the advertising vehicle. In some embodiments, the sensor 162 is similar to the front camera 114. In some embodiments, the sensor 162 is different from the front camera 114. In some embodiments, the sensor 162 includes multiple sensing elements at multiple locations on the advertising vehicle. In some embodiments, the sensor 162 includes a single sensor.

The localization unit 164 is configured to receive information from the GPS 160 and the sensor 162 and determining a location of the advertising vehicle in the world coordinate system or a location of the viewing vehicle relative to the objects on the GPS 160 and objects detected by the sensor 162. In some embodiments, the localization unit 162 is similar to the localization unit 126. In some embodiments, the localization unit 162 is different from the localization unit 126.

The information related to the advertisement 166 is usable to help the server 130 determine what advertisement is being displayed on the advertising vehicle and the area of the vehicle displaying the advertisement. In some embodiments where the advertising vehicle is able to display multiple advertisements, the driver 170 is able to enter information related to the advertisement 166 via the UI 158. In some embodiments where the advertisement is an adjustable advertisement, the information related to the advertisement 166 provides information related to a timing and sequence of advertisement displayed on the vehicle. In some embodiments, the information related to the advertisement 166 is updatable by the driver 170, e.g., via the UI 158. In some embodiments, the information related to the advertisement 166 is updatable based on information received from the server 130 or another external device. In some embodiments, the travel plan receiver 152 includes instructions for what advertisement is to be displayed on an adjustable advertisement.

The banking system 180 includes a financial service able to receive payment for the operator of the advertising vehicle based on instructions received from the server 130. In some embodiments, the payment includes currency, cryptocurrency, or other electronic payment options. The banking system 180 includes an operator bank account 182 which is accessible by the operator of the advertising vehicle. In some embodiments, the operator banking account 182 is accessible by the driver 170. In some embodiments, the operator banking account 182 is accessible by an owner of the advertising vehicle.

The customers 190 include advertising sponsor 192 who have products or services to advertise. The customers 190 further include advertisement agencies 194 who assist advertising sponsors 192 market products or services. In some embodiments, the advertisement agencies 194 include companies that lease the contract with advertising vehicle for displaying mobile advertisements. In some embodiments, the customers 190 include other people, companies or agencies. For example, in some embodiments, the customers 190 include government agencies that are able to use the information from the advertisement advisor 144 to grant permission for additional advertising options or determine whether any advertising options presents a risk as being too distracting for drivers. In some embodiments, the customers 190 provide data requests to the server 130 for information related to specific signs, advertising sponsors 192 or other desired data. In some embodiments, the data requests are transmitted to the server 130 wirelessly. In some embodiments, the data requests are transmitted to the server 130 via a wired connection.

By outputting the histogram information to the customers 190, the mobile advertising system 100 is able to use real detected data to determine effectiveness of advertisements in attracting attention of occupants of vehicles. This effectiveness information is usable to assist advertising sponsors 192 in allocating resources in a more efficient manner. This effectiveness information is also usable by advertisement agencies 194 to set pricing options for different mobile advertisement options that are commensurate with the actual attention garnered by vehicle occupants. In addition, by updating the histogram periodically or as new gaze data is available, advertising sponsors 192 and advertisement agencies 194 are able to identify consumer trends without directly surveying consumers.

Figure 2:
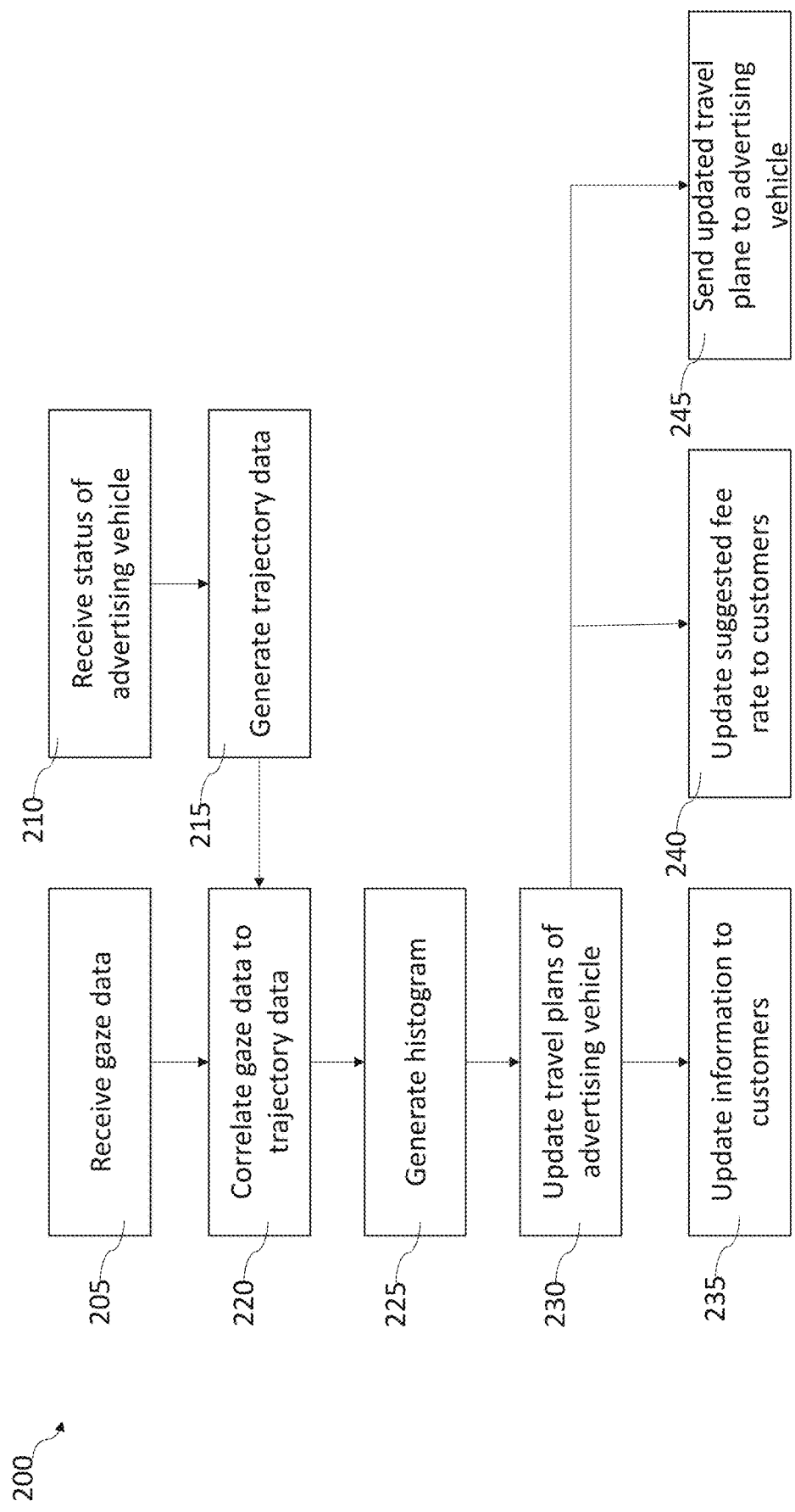
FIG. 2 is a flowchart of a method of advertising using a vehicle, in accordance with some embodiments.

FIG. 2 is a flowchart of a method 200 of advertising using a vehicle, in accordance with some embodiments. In some embodiments, the method 200 is implemented using mobile advertising system 100 (FIG. 1). In some embodiments, the method 200 is implemented using the server 130 (FIG. 1). In some embodiments, the method 200 is implemented using the system 1200 (FIG. 12).

In operation 205, gaze data is received for an occupant in a viewing vehicle. In some embodiments, the occupant is a driver of the viewing vehicle. In some embodiments, the occupant is not a driver of the viewing vehicle. In some embodiments, the gaze data is received based on information from a device mounted to the viewing vehicle. In some embodiments, the gaze data is received based on information separable from the viewing vehicle, such as smart glasses. In some embodiments where the gaze data is received based on smart glasses information, the occupant is a pedestrian or a bicycle rider instead of being within the viewing vehicle. The gaze data includes information related to an angle of a gaze of the occupant relative to the viewing vehicle and a time that the gaze data was collected. In some embodiments, the gaze data further includes information related to objects known or detected in the environment surrounding the viewing vehicle. In some embodiments, the gaze data is received wirelessly. In some embodiments, the gaze data is received via a wired connection. In some embodiments, the gaze data is received by the attention area analyzer 132 (FIG. 1).

In operation 210, a status of an advertising vehicle is received. The status of the advertising vehicle includes information regarding a location and pose of the advertising vehicle. The status of the advertising vehicle further includes time information related to the location and pose of the advertising vehicle. In some embodiments, the status of the advertising vehicle includes information related to a content of an advertisement on the advertising vehicle. In some embodiments, the status of the advertising vehicle includes information related to a position of an advertisement on the advertising vehicle. In some embodiments, the status of the advertising vehicle includes information related to multiple advertisements on the advertising vehicle and a location of each of the multiple advertisements. In some embodiments, the status of the advertising vehicle further includes information related to whether an engine or motor of the advertising vehicle is running. In some embodiments, the status of the advertising vehicle is received wirelessly. In some embodiments, the status of the advertising vehicle is received via a wired connection. In some embodiments, the status of the advertising vehicle is received by the travel path analyzer 136 (FIG. 1).

In operation 215, trajectory data is generated based on the status of the advertising vehicle. The trajectory data is usable to determine an orientation in the real world of the advertising vehicle relative to known objects. In some embodiments, the trajectory data is generated based on a known travel plan of the advertising vehicle. In some embodiments, the trajectory data is generated using the travel path analyzer 136 (FIG. 1).

In operation 220, the trajectory data is correlated to the received gaze data. Correlating the trajectory data with the received gaze data permits determination of whether the gaze data indicates that the occupant was viewing an advertisement attached to the advertising vehicle. In some embodiments where the advertising vehicle has multiple advertisements, the correlation also identifies which advertisement was viewed by the occupant based on information related to which portion of the advertising vehicle was viewed by the occupant of the viewing vehicle and the location of the advertisements on the advertising vehicle. In some embodiments, the trajectory data is correlated with the received gaze data using the attention sign analyzer 138 (FIG. 1).

In operation 225, a histogram is generated based on the correlation between the trajectory data and the received gaze data. The histogram associates the correlation between the gaze data and map data with additional data, such as date, time, demographic data, or other suitable information. In some embodiments, the histogram is based on time of day, weather conditions, sign location, sign angle relative to a vehicle heading, demographic information, or other suitable criteria. In some embodiments, the histogram is generated using the attention sign analyzer 138 (FIG. 1).

In operation 230, a travel plan for the advertising vehicle is updated based on the histogram. The updating of the travel plan is used to improve effectiveness of the mobile advertising of the advertising vehicle. The travel plan is updated to have the mobile advertisement move through locations where target demographics of the mobile advertisement are more likely to be located. In some embodiments, the updated travel plan is intended for immediate implementation. In some embodiments, the updated travel plan is intended for further implementation, meaning that the updated travel plan is usable for a next time the advertising vehicle is driven, in some instances. In some embodiments, the updated travel plan includes a time to begin driving, a desired speed to be maintained during the implementation of the updated travel plan, a requested position of the mobile advertisement on the advertising vehicle, or other suitable information. In some embodiments, the updated travel plan is implemented by a driver or operator of the advertising vehicle. In some embodiments where the advertising vehicle is capable of autonomous driving, the updated travel plan includes instructions executable by the autonomous driving vehicle to permit the autonomous driving vehicle to implement the updated travel plan. In some embodiments, the travel plan is updated using the advertisement adviser 144 (FIG. 1).

In operation 235, an update is sent to the customers. In some embodiments, the customers include the customers 190 (FIG. 1). In some embodiments, the update includes information based on the histogram to inform the customers related to amount of views of the mobile advertisement, demographics of viewers of the mobile advertisement, duration of viewing of the mobile advertisement, locations where the mobile advertisement was viewed, or other suitable information. In some embodiments, the update is sent wirelessly. In some embodiments, the update is sent via a wired connection. In some embodiments, the update includes a response to a data request received from the customers. In some embodiments, the update is transmitted from the advertisement adviser 144 (FIG. 1).

In operation 240, an update related to a suggested fee for the mobile advertisement is sent to the customers. In some embodiments, the customers include the customers 190 (FIG. 1). In some embodiments, the updated fee is determined based on a number of views of the mobile advertisement, demographics of viewers of the mobile advertisement, duration of viewing of the mobile advertisement, or other suitable information. In some embodiments, the updated fee is determined by the advertisement adviser 144 (FIG. 1). In some embodiments, the fee update is sent wirelessly. In some embodiments, the fee update is sent via a wired connection. In some embodiments, the updated fee is sent using the advertisement adviser 144 (FIG. 1). In some embodiments, the updated fee is sent in response to a request from the customers. In some embodiments, the updated fee is sent in response to a request from a driver or operator of the advertising vehicle.

In operation 245, the updated travel plan is transmitted to the advertising vehicle. In some embodiments, the updated travel plan is transmitted wirelessly. In some embodiments, the updated travel plan is transmitted via a wired connection. In some embodiments, the updated travel plan is transmitted by the advertisement adviser 144 (FIG. 1).

One of ordinary skill in the art would understand that modifications to the method 200 are within the scope of this description. In some embodiments, additional operations are included in the method 200. For example, in some embodiments, the method 200 includes transferring payment instructions to a banking system to pay the driver or operator of the advertising vehicle. In some embodiments, at least one operation of the method 200 is omitted. For example, in some embodiments, the operation 210 is omitted and a viewing of an advertisement is determined based on image data received with the gaze data. In some embodiments, an order of operations of the method 200 is adjusted. For example, in some embodiments, the update to the customer is transmitted prior to generating the updated travel plan.

Figure 3:
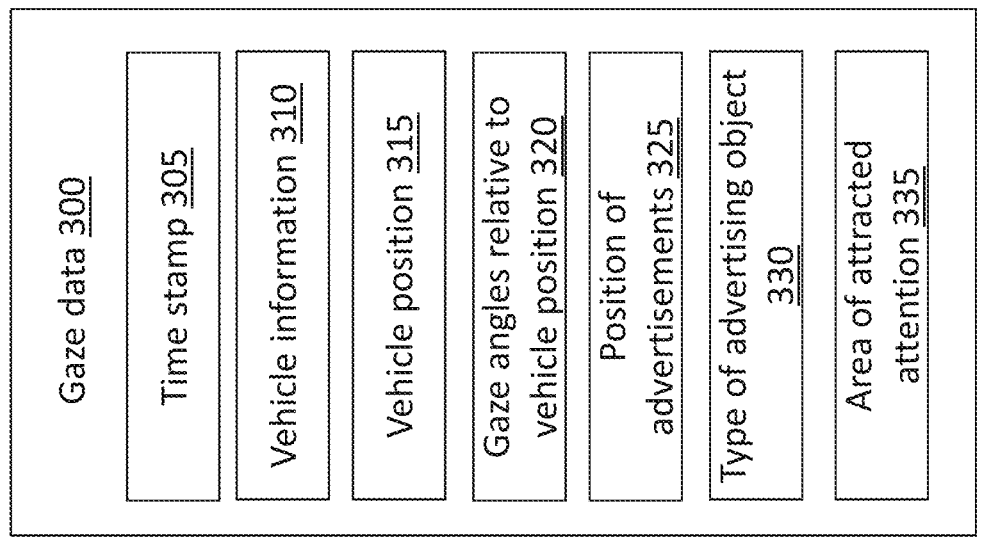
FIG. 3 is a view of a data structure of gaze data, in accordance with some embodiments.

FIG. 3 is a view of a data structure 300 of gaze data, in accordance with some embodiments. In some embodiments, the data structure 300 corresponds to gaze data transmitted from the viewing vehicle system 110 to the server 130 (FIG. 1). In some embodiments, the data structure 300 corresponds to gaze data used by the server 130 (FIG. 1) to determine whether viewing of a mobile advertisement occurred, generate travel plans, provide payment instructions for the driver or operator of the advertising vehicle, or provide recommendations to customers.

The data structure 300 of the gaze data includes time stamp information 305. The time stamp information 305 indicates a time at which the gaze data was collected. The data structure 300 further includes vehicle information 310. The vehicle information 310 indicates a type of vehicle of the viewing vehicle, such as an automobile, a motorcycle, a pedestrian, a bicycle, etc. The data structure 300 further includes vehicle position information 315. The vehicle position information 315 indicates a location and a pose of the viewing vehicle in the real world. In some embodiment, the location and pose are determined relative to the location of known objects based on map data. The data structure 300 further includes gaze angles 320 relative to the vehicle position. The gaze angles 320 indicate a direction that an occupant is looking relative to the pose of the viewing vehicle. The data structure 300 further includes position of advertisement 325. The position of advertisement 325 indicates a location of a mobile advertisement detected by a sensor, such as front camera 114 (FIG. 1), of the viewing vehicle at a time matching the time stamp information 305. The data structure 300 further includes type of advertisement information 330. The type of advertisement information 330 indicates whether the mobile advertisement is a sign attached to the advertising vehicle, a display on a roof of the advertising vehicle, or other suitable information. In some embodiments, the type of advertisement information 330 indicates a size of the mobile advertisement relative to the advertising vehicle. In some embodiments, the type of advertisement information 330 is determined based on data received by using a sensor, such as the front camera 114 (FIG. 1), of the viewing vehicle. The data structure 300 further includes area of attracted attention 335. The area of attracted attention 335 indicates an area of the advertising vehicle that drew the attention the occupant that is the source of the gaze data. In some embodiments, the area of attracted attention 335 is determined based on data received by using a sensor, such as the front camera 114 (FIG. 1), of the viewing vehicle.

The data structure 300 is merely exemplary and one of ordinary skill in the art would understand that different information is able to be included in the gaze data. In some embodiments, at least one of the components is excluded from the data structure 300. For example, in some embodiments, the area of attracted attention 335 is excluded from the data structure 300. In some embodiments, additional information is included in the data structure 300. For example, in some embodiments, the data structure 300 further includes demographic information of the occupant that is the source of the gaze data.

Figure 4:
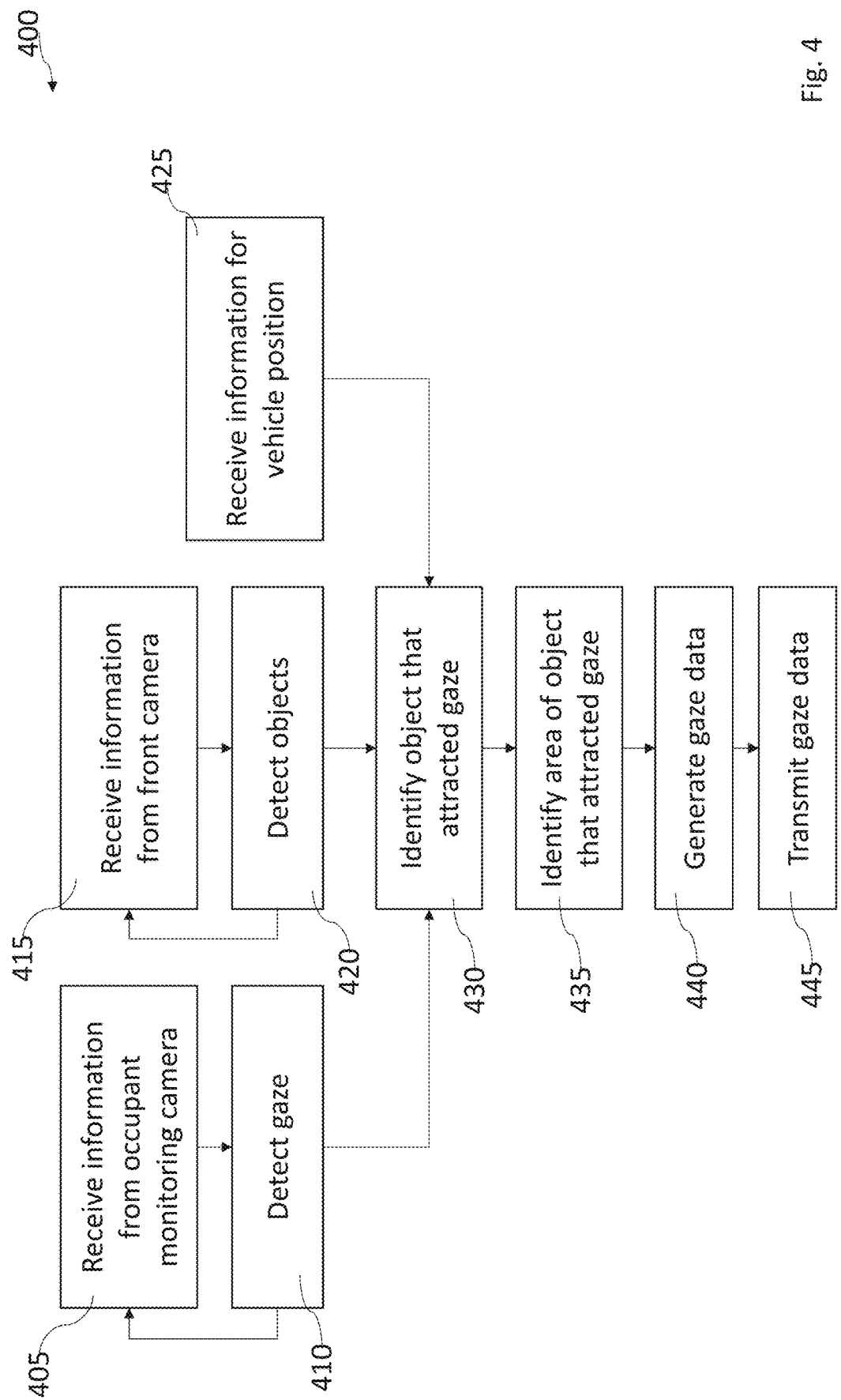
FIG. 4 is a flowchart of a method of generating gaze data, in accordance with some embodiments.

FIG. 4 is a flowchart of a method of generating gaze data, in accordance with some embodiments. In some embodiments, the method 400 is implemented using mobile advertising system 100 (FIG. 1). In some embodiments, the method 400 is implemented using the viewing vehicle system 110 (FIG. 1). In some embodiments, the method 400 is implemented using the system 1200 (FIG. 12).

In operation 405 information regarding the occupant is received from a monitoring camera, e.g., occupant monitoring camera 112 (FIG. 1). In some embodiments, the information includes images captured using a single image capturing device. In some embodiments, the information includes images captured using multiple image capturing devices. In some embodiments, the image capturing devices are located at different positions relative to the occupant. In some embodiments, at least one of the image capturing devices is able to be selectively deactivated.

In operation 610, a gaze of the occupant is detected based on the received information. In some embodiments, the gaze of the occupant is detected based on an azimuth angle and an elevation angle of eyes of the occupant detected based on captured images of the occupant. In some embodiments, the gaze of the occupant is also detected based on a depth coordinate determined based on visual axes of the eyes of the occupant from the captured images of the driver. In some embodiments, the gaze of the occupant is detected based on information from a camera, e.g., front camera 114 (FIG. 1), of the viewing vehicle; and the gaze is associated with pixel locations of images captured by the camera. In some embodiments, the operation 610 is performed based on data collected in operation 415. In some embodiments, the gaze of the occupant is detected using a gaze detector, e.g., gaze detector 122 (FIG. 1).

In operation 415, information regarding an environment surrounding the viewing vehicle is received from a front camera. The information regarding the environment surrounding the viewing vehicle is received using one or more sensors mounted to the vehicle. In some embodiments, the sensors include a visual light camera, an IR camera, a LiDAR sensor, a RADAR sensor, a SONAR sensor, or another suitable sensor. In some embodiments, the sensor includes front camera 114 (FIG. 1). In some embodiments, the information from operation 415 are used in operation 410 to relate a gaze of the occupant to the information from operation 415.

In operation 420, objects are detected based on the data collected in operation 415. In some embodiments, the objects are detected by a trained neural network analyzing the data from operation 415. In some embodiments, the objects are detected using an object detector, e.g., object detector 124 (FIG. 1). In some embodiments, the neural network of the object detector 124 uses a neural network architecture such as Single Shot Detector (SSD), Faster R-CNN, and etc. In some embodiments, in addition to detecting a position of the objects, operation 420 includes detecting an angle of the objects relative to the viewing vehicle.

In operation 425, a location of the viewing vehicle in the world coordinate system or a location of the viewing vehicle relative to the objects detected in operation 420 is determined. In some embodiments, the operation 425 further determines state information for the viewing vehicle. In some embodiments, the state information includes speed of the viewing vehicle. In some embodiments, the state information includes velocity vector of the viewing vehicle. In some embodiments, the state information includes heading of the viewing vehicle. In some embodiments, the state information includes acceleration vector of the viewing vehicle. In some embodiments, the state information includes jerk vector of the viewing vehicle. In some embodiments, the state information includes whether an engine or motor of the viewing vehicle is running. In some embodiments, the state information includes other status information related to the viewing vehicle, such as changes in speed (acceleration), operation of wind shield wipers, etc. In some embodiments, the operation 425 is implemented using a localization unit, e.g., localization unit 126 (FIG. 1).

In operation 430, an object that the detected gaze is directed toward is identified. The object is identified by correlating the detected case with the detected objects. The detected gaze is mapped to the surrounding environment to identify an intersection point between the gaze and a detected object. In some embodiments, the operation 430 is implemented using the localization unit 126 (FIG. 1).

In operation 435, an area of the object that the detected gaze is directed toward is identified. The area is identified by correlating the detected case with the detected objects. The detected gaze is mapped to the surrounding environment to identify an intersection point between the gaze and a portion of the detected object. In some embodiments, the information from operation 415 lacks sufficient resolution to precisely impalement operation 435 and operation 435 is omitted. In some embodiments, the operation 435 is implemented using the localization unit 126 (FIG. 1).

In operation 440, gaze data is generated based on data from operation 410, operation 420 and operation 425. The gaze data is generated using a gaze data generator, e.g., gaze data generator 128 (FIG. 1). In some embodiments, the operation 430 and/or operation 435 is also used to produce gaze data. In some embodiments, the gaze data includes time stamp information, vehicle information of the vehicle system, position of the viewing vehicle, and gaze angles of the occupant relative to the viewing vehicle. In some embodiments, the gaze data further links the gaze data with locations of objects from either the operation 430 and/or the operation 435. In some embodiments, operation 440 determines what, if any, mobile advertisements are visible to the occupant. In some embodiments, the operation 440 identifies objects that are obstructed by other objects that would prevent the occupant from seeing the obstructed objects. In some embodiments, the gaze data excludes any gaze data related to objects that are determined as being obstructed based on information from the operation 420 and/or the operation 425. In some embodiments, the gaze data includes the information of the second vehicle (such as a position, a license plate ID, and etc.) where a mobile advertisement is displayed.

In some embodiments, the gaze data further includes at least one image of the occupant to permit demographic analysis of the occupant based on a captured image. In some embodiments, the gaze data includes occupant identification data, such as an identification number of the occupant, to permit demographic analysis of the occupant. In some embodiments, the occupant identification data is received based on ownership or rental information from an internal memory or from an external device.

In operation 445, the gaze data generated in operation 440 is sent to a server, e.g., server 130 (FIG. 1). In some embodiments, the gaze data is transmitted wirelessly. In some embodiments, the gaze data is transmitted via a wired connection.

In some embodiments, additional operations are included in the method 400. For example, in some embodiments, the method 400 includes generating demographical information for the driver based on the captured images of the driver. In some embodiments, an order of operations of the method 400 is changed. For example, in some embodiments, the identification of objects that attracted a gaze is performed after transmission of the gaze data to the server. In some embodiments, at least one operation of the method 400 is omitted. For example, in some embodiments, operation 430 or operation 435 is omitted or is performed by the server.

Figure 5:
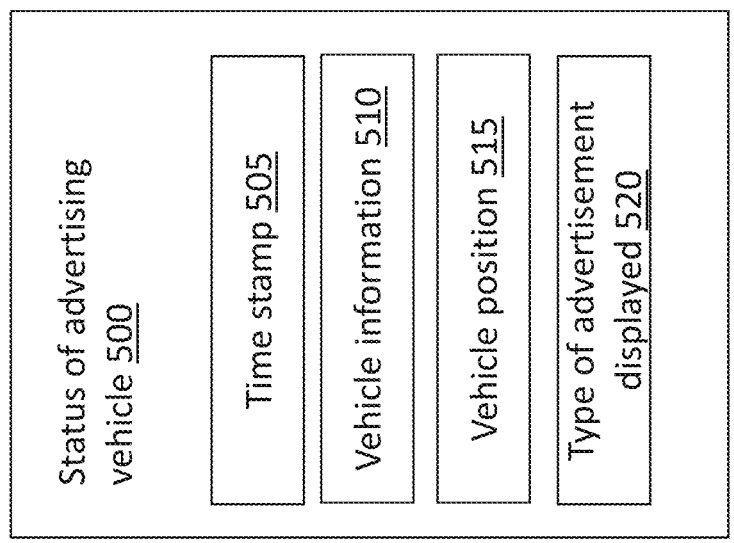
FIG. 5 is a view of a data structure of a status of an advertising vehicle, in accordance with some embodiments.

FIG. 5 is a view of a data structure 500 of a status of an advertising vehicle, in accordance with some embodiments. In some embodiments, the data structure 500 corresponds to status of the advertising vehicle transmitted from the advertising vehicle system 150 to the server 130 (FIG. 1). In some embodiments, the data structure 500 corresponds to status of advertising vehicle data used by the server 130 (FIG. 1) to determine whether viewing of a mobile advertisement occurred, generate travel plans, provide payment instructions for the driver or operator of the advertising vehicle, or provide recommendations to customers.

The data structure 500 includes time stamp information 505. The time stamp information 505 indicates a time corresponding to the location, pose and other data related to the advertising vehicle received. The data structure 500 further includes vehicle information 510. The vehicle information 510 indicates whether an engine or motor of the advertising vehicle is running, a position of the displayed advertisements, or other suitable information. The data structure 500 further includes vehicle position information 515. The vehicle position information 515 includes location and pose information of the advertising vehicle. The data structure 500 further includes type of advertisement displayed information 520. The type of advertisement displayed information 520 indicates content and structure of the mobile advertisement attached to the advertising vehicle. In some embodiments where the advertisement is an adjustable advertisement, the type of advertisement displayed information 520 indicates a sequence and timing of the various advertisements displayed by the adjustable advertisement. In some embodiments, the advertising vehicle 150 is shared by multiple drivers, and the data structure 500 includes identifying information of the driver that is driving the vehicle to help ensure that the correct driver is receiving credit.

The data structure 500 is merely exemplary and one of ordinary skill in the art would understand that different information is able to be included in the gaze data. In some embodiments, at least one of the components is excluded from the data structure 500. For example, in some embodiments, the vehicle information 310 is excluded from the data structure 500. In some embodiments, additional information is included in the data structure 500. For example, in some embodiments, the data structure 500 further includes driver identification information for the advertising vehicle.

Figure 6:
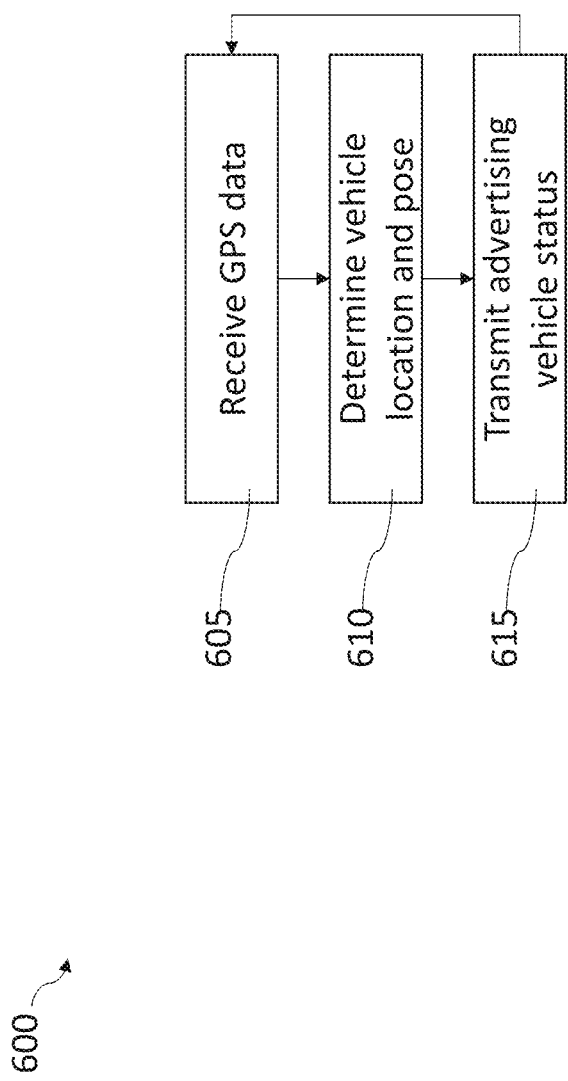
FIG. 6 is a flowchart of a method of determining a status of an advertising vehicle, in accordance with some embodiments.

FIG. 6 is a flowchart of a method 600 of determining a status of an advertising vehicle, in accordance with some embodiments. In some embodiments, the method 600 is implemented using mobile advertising system 100 (FIG. 1). In some embodiments, the method 600 is implemented using the advertising vehicle system 150 (FIG. 1). In some embodiments, the method 600 is implemented using the system 1200 (FIG. 12).

In operation 605, GPS data is received. The GPS data is received in order to determine a position of the advertising vehicle relative to other known objects in the real world. In some embodiments, the GPS data is received from a device external to the advertising vehicle. In some embodiments, the GPS data is received from a GPS sensor within the advertising vehicle. In some embodiments, the GPS data is received from GPS 160 (FIG. 1). In some embodiments, the GPS data is received by the navigation system 156 (FIG. 1). In some embodiments, the GPS data is received by the localization unit 164 (FIG. 1).

In operation 610, a vehicle location and pose of the advertising vehicle is determined based on the received GPS data. In some embodiments, the vehicle location and pose are determined based on sensor data, e.g., from the sensor 162 (FIG. 1). In some embodiments, the vehicle location and pose are determined by the localization unit 164 (FIG. 1).

In operation 615, the advertising vehicle status is transmitted. The advertising vehicle status includes vehicle location and pose information. In some embodiments, the advertising vehicle status information includes additional information such as mobile advertisement location on the advertising vehicle, whether an engine or motor of the advertising vehicle is running, content of a mobile advertisement attached to the advertising vehicle, or other suitable information. In some embodiments, the advertising vehicle status is transmitted by the status notifier 154 (FIG. 1). In some embodiments, the advertising vehicle status is transmitted wirelessly. In some embodiments, the advertising vehicle status is transmitted via a wired connection. Following operation 615, the method 600 returns to operation 605.

One of ordinary skill in the art would understand that modifications to the method 600 are within the scope of this description. In some embodiments, additional operations are included in the method 600. For example, in some embodiments, the method 600 includes updating a travel plan for the advertising vehicle. In some embodiments, at least one operation of the method 600 is omitted. For example, in some embodiments, the operation 605 is omitted because the position of the advertising vehicle is tracked by an external device.

Figure 7:
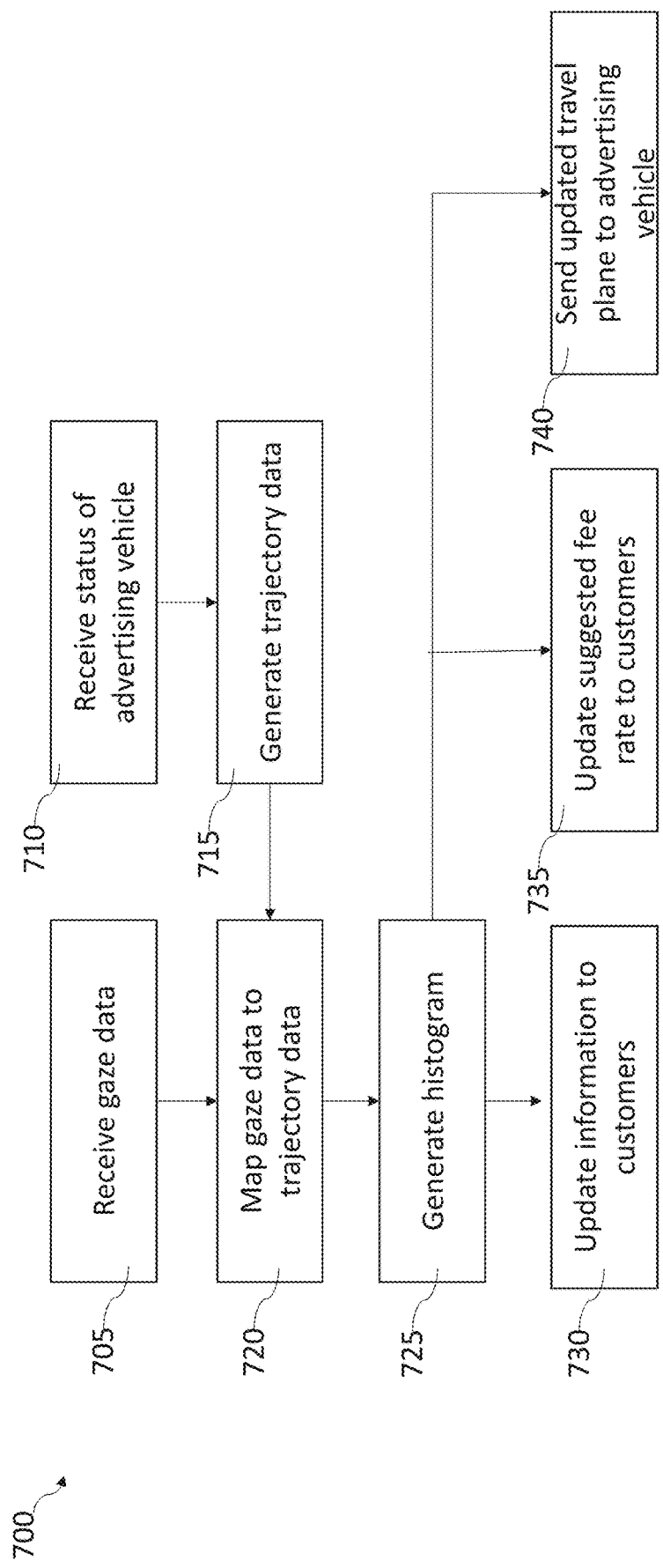
FIG. 7 is a flowchart of a method of evaluating advertising using a vehicle, in accordance with some embodiments.

FIG. 7 is a flowchart of a method 700 of evaluating advertising using a vehicle, in accordance with some embodiments. In some embodiments, the method 700 is implemented using mobile advertising system 100 (FIG. 1). In some embodiments, the method 700 is implemented using the server 130 (FIG. 1). In some embodiments, the method 700 is implemented using the system 1200 (FIG. 12).

In operation 705, gaze data is received for an occupant in a viewing vehicle. In some embodiments, the occupant is a driver of the viewing vehicle. In some embodiments, the occupant is not a driver of the viewing vehicle. In some embodiments, the gaze data is received based on information from a device mounted to the viewing vehicle. In some embodiments, the gaze data is received based on information separable from the viewing vehicle, such as smart glasses. In some embodiments where the gaze data is received based on smart glasses information, the occupant is a pedestrian or a bicycle rider instead of being within the viewing vehicle. The gaze data includes information related to an angle of a gaze of the occupant relative to the viewing vehicle and a time that the gaze data was collected. In some embodiments, the gaze data further includes information related to objects known or detected in the environment surrounding the viewing vehicle. In some embodiments, the gaze data is received wirelessly. In some embodiments, the gaze data is received via a wired connection. In some embodiments, the gaze data is received by the attention area analyzer 132 (FIG. 1).

In operation 710, a status of an advertising vehicle is received. The status of the advertising vehicle includes information regarding a location and pose of the advertising vehicle. The status of the advertising vehicle further includes time information related to the location and pose of the advertising vehicle. In some embodiments, the status of the advertising vehicle includes information related to a content of an advertisement on the advertising vehicle. In some embodiments, the status of the advertising vehicle includes information related to a position of an advertisement on the advertising vehicle. In some embodiments, the status of the advertising vehicle includes information related to multiple advertisements on the advertising vehicle and a location of each of the multiple advertisements. In some embodiments, the status of the advertising vehicle further includes information related to whether an engine or motor of the advertising vehicle is running. In some embodiments, the status of the advertising vehicle is received wirelessly. In some embodiments, the status of the advertising vehicle is received via a wired connection. In some embodiments, the status of the advertising vehicle is received by the travel path analyzer 136 (FIG. 1).

In operation 715, trajectory data is generated based on the status of the advertising vehicle. The trajectory data is usable to determine an orientation in the real world of the advertising vehicle relative to known objects. In some embodiments, the trajectory data is generated based on a known travel plan of the advertising vehicle. In some embodiments, the trajectory data is generated using the attention sign analyzer 138 (FIG. 1).

In operation 720, the trajectory data is correlated to the received gaze data. Correlating the trajectory data with the received gaze data permits determination of whether the gaze data indicates that the occupant was viewing an advertisement attached to the advertising vehicle. In some embodiments where the advertising vehicle has multiple advertisements, the correlation also identifies which advertisement was viewed by the occupant based on information related to which portion of the advertising vehicle was viewed by the occupant of the viewing vehicle and the location of the advertisements on the advertising vehicle. In some embodiments, the trajectory data is correlated with the received gaze data using the attention sign analyzer 138 (FIG. 1).

In operation 725, a histogram is generated based on the correlation between the trajectory data and the received gaze data. The histogram associates the correlation between the gaze data and map data with additional data, such as date, time, demographic data, or other suitable information. In some embodiments, the histogram is based on time of day, weather conditions, sign location, sign angle relative to a vehicle heading, demographic information, or other suitable criteria. In some embodiments, the histogram is generated using the attention sign analyzer 138 (FIG. 1).

In operation 730, an update is sent to the customers. In some embodiments, the customers include the customers 190 (FIG. 1). In some embodiments, the update includes information based on the histogram to inform the customers related to amount of views of the mobile advertisement, demographics of viewers of the mobile advertisement, duration of viewing of the mobile advertisement, locations where the mobile advertisement was viewed, or other suitable information. In some embodiments, the update is sent wirelessly. In some embodiments, the update is sent via a wired connection. In some embodiments, the update includes a response to a data request received from the customers. In some embodiments, the update is transmitted from the advertisement adviser 144 (FIG. 1).

In operation 735, an update related to a suggested fee for the mobile advertisement is sent to the customers. In some embodiments, the customers include the customers 190 (FIG. 1). In some embodiments, the updated fee is determined based on a number of views of the mobile advertisement, demographics of viewers of the mobile advertisement, duration of viewing of the mobile advertisement, or other suitable information. In some embodiments, the updated fee is determined by the advertisement adviser 144 (FIG. 1). In some embodiments, the fee update is sent wirelessly. In some embodiments, the fee update is sent via a wired connection. In some embodiments, the updated fee is sent using the advertisement adviser 144 (FIG. 1). In some embodiments, the updated fee is sent in response to a request from the customers. In some embodiments, the updated fee is sent in response to a request from a driver or operator of the advertising vehicle.

In operation 740, the updated travel plan is transmitted to the advertising vehicle. In some embodiments, the updated travel plan is transmitted wirelessly. In some embodiments, the updated travel plan is transmitted via a wired connection. In some embodiments, the updated travel plan is transmitted by the advertisement adviser 144 (FIG. 1).

One of ordinary skill in the art would understand that modifications to the method 700 are within the scope of this description. In some embodiments, additional operations are included in the method 700. For example, in some embodiments, the method 700 includes transferring payment instructions to a banking system to pay the driver or operator of the advertising vehicle. In some embodiments, at least one operation of the method 700 is omitted. For example, in some embodiments, the operation 735 is omitted. In some embodiments, an order of operations of the method 700 is adjusted. For example, in some embodiments, the update to the customer is transmitted prior to sending the updated travel plan.

Figure 8:
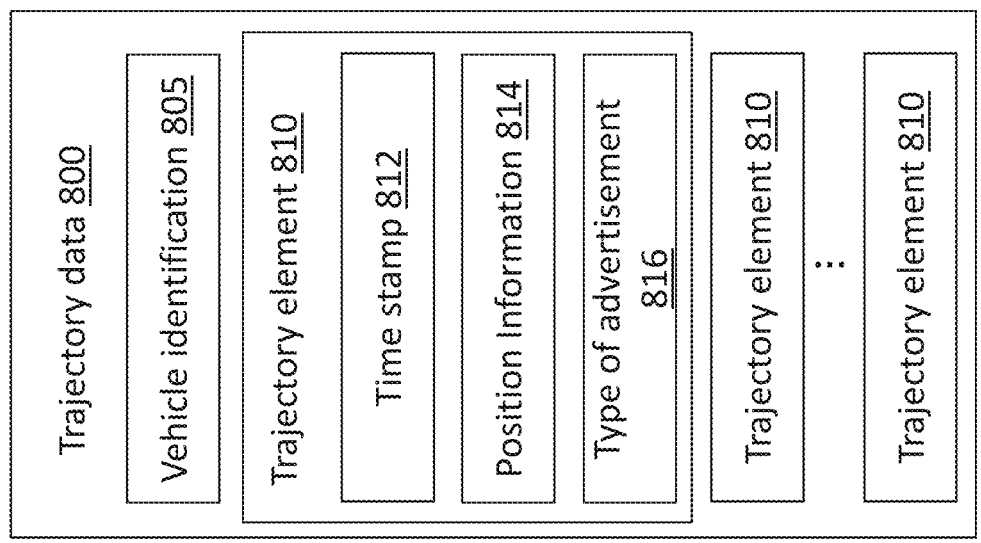
FIG. 8 is a view of a data structure of trajectory data, in accordance with some embodiments.

FIG. 8 is a view of a data structure 800 of trajectory data, in accordance with some embodiments. In some embodiments, the data structure 800 corresponds to trajectory data determined by the travel path analyzer 136 (FIG. 1). In some embodiments, the data structure 800 corresponds to trajectory data used by the attention sign analyzer 138 (FIG. 1) to correlate the gaze data with the trajectory data.

The data structure 800 includes vehicle identification information 805. The vehicle identification information 805 indicates identifying information for the advertising vehicle, such as license plate number, vehicle identification number (VIN), registration information based on registration with the customers, e.g., the customers 190 (FIG. 1), or other suitable information. The data structure 800 further includes multiple trajectory elements 810 captured at different times. Each of the trajectory elements 810 includes similar types of information so that the viewing of the mobile advertisement attached to the advertising vehicle is able to be determined at various times while the advertising vehicle is moving along a travel path. In some embodiments, a time between determining trajectory elements 810 is set based on receipt of updated location information from the advertising vehicle. In some embodiments, the advertising vehicle system, e.g., the advertising vehicle system 150 (FIG. 1), is configured to transmit location information at regular interval. For example, in some embodiments, the regular interval ranges from about 1 second to about 10 seconds. If the regular interval is too long, then precision of determining advertising effectiveness decreases, in some instances. If the regular interval is too short, then processing load on the server, e.g., the server 130 (FIG. 1), is increased without a noticeable improvement in precision, in some instances. In some embodiments, advertising vehicle location information is transmitted in response to a trigger event, such as traveling a certain distance, passing a predetermined location, responding to a request from the server, etc.

The trajectory element 810 includes time stamp information 812. The time stamp information 812 indicates a time at which the information in the corresponding trajectory element 810 was collected. The trajectory element 810 further includes position information 814. The position information 814 indicates location and pose information associated with the advertising vehicle. In some embodiments, the position information 814 is determined by the localization unit 164 (FIG. 1). In some embodiments, the trajectory includes the locations that the vehicle has passed through in the past. In some embodiments, the trajectory includes the predicted trajectory through which the vehicle is going to pass. The trajectory element 810 further includes a type of advertisement displayed 816. The type of advertisement displayed 816 indicates whether the mobile advertisement is a sign attached to the advertising vehicle, a display on a roof of the advertising vehicle, or other suitable information. In some embodiments, the type of advertisement displayed 816 indicates a size of the mobile advertisement relative to the advertising vehicle. In some embodiments, the type of advertisement displayed is determined based on information received from a driver or operator of the advertising vehicle, e.g., through UI 158 (FIG. 1). In some embodiments where the mobile advertisement is an adjustable advertisement, the type of advertisement displayed 816 is provided by the mobile advertisement to a status notifier, e.g., status notifier 154 (FIG. 1).

The data structure 800 is merely exemplary and one of ordinary skill in the art would understand that different information is able to be included in the gaze data. In some embodiments, at least one of the components is excluded from the data structure 800. For example, in some embodiments, the type of advertisement displayed 816 is excluded from the data structure 800 when the advertising vehicle is associated with a single type of advertisement already. In some embodiments, additional information is included in the data structure 800. For example, in some embodiments, the data structure 800 further includes location of each of the advertisements displayed.

Figure 9:
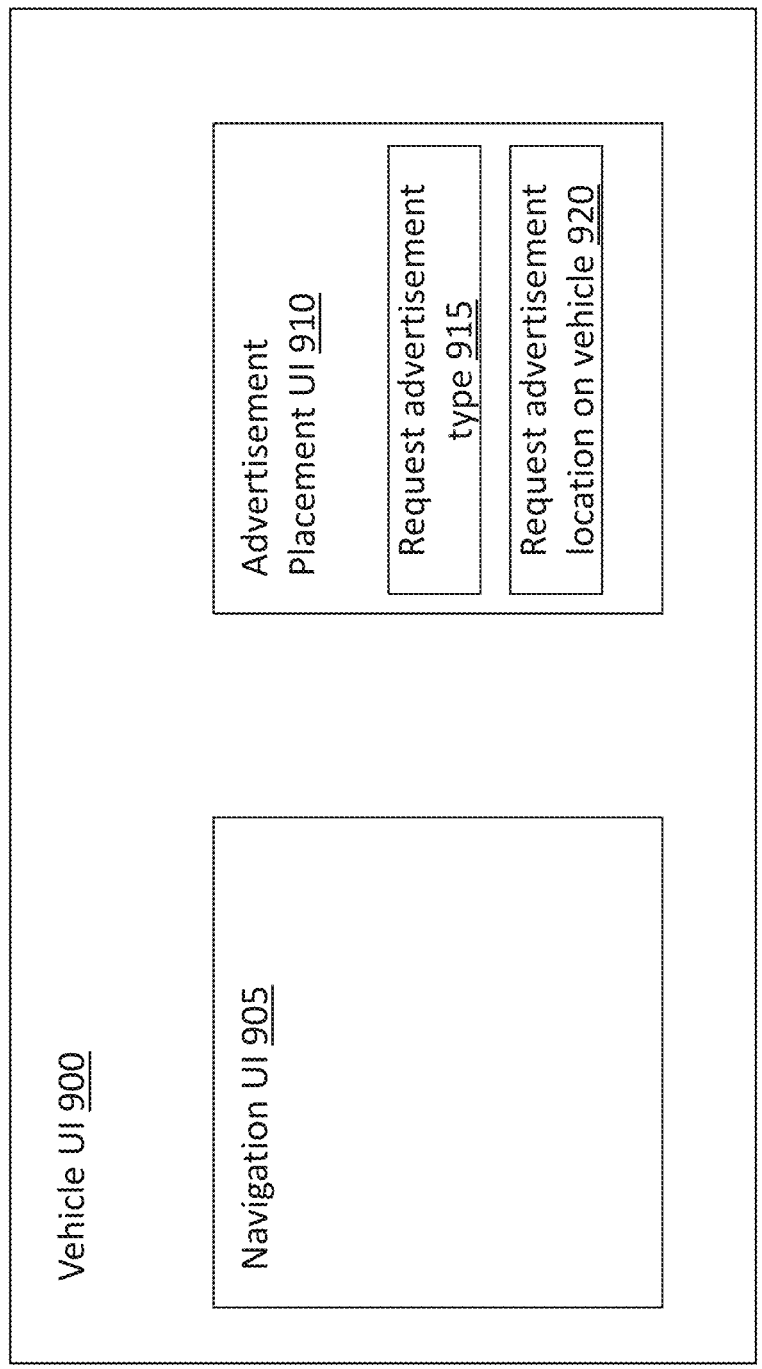
FIG. 9 is a view of a user interface for a vehicle, in accordance with some embodiments.

FIG. 9 is a view of a user interface 900 for a vehicle, in accordance with some embodiments. In some embodiments, the UI 900 corresponds to the UI 158 (FIG. 1). The UI 900 is usable to notify a driver of the advertising vehicle of a travel path using the navigation UI 905. The UI 900 is further usable to notify the driver of the advertising vehicle of requested advertisement types and advertisement display locations on the advertising vehicle using the advertisement placement UI 910. In some embodiments, the UI 900 is configured to receive information from the driver of the advertising vehicle or from another occupant of the advertising vehicle. In some embodiments, the UI 900 is integrated into the advertising vehicle. In some embodiments, the UI 900 is separable from the advertising vehicle. In some embodiments, the UI 900 is a mobile device, such as a smartphone.

The navigation UI 905 is configured to receive GPS information, e.g., from GPS 160 (FIG. 1), and display a map visible to the driver of the advertising vehicle. The navigation UI 905 is further configured to display a travel path along the map that the advertising vehicle is intended to traverse. In some embodiments, the navigation UI 905 includes a touchscreen. In some embodiments, the navigation UI 905 is configured to receive updates to the map and/or the travel path from an external device, such as the server 130 (FIG. 1).

The advertisement placement UI 910 includes a requested advertisement type field 915 and a requested advertisement location on vehicle field 920. The requested advertisement type field 915 is configured to notify the driver of the advertising vehicle of a requested advertisement to be displayed on the advertising vehicle. In a situation where the driver of the advertising vehicle has access to multiple different mobile advertisements, the requested advertisement type field 915 is usable to notify the driver of the advertising vehicle which of the mobile advertisements is preferred by the customers, e.g., customers 190 (FIG. 1). In some embodiments, the requested advertisement type field 915 includes information about fees payable to the driver or operator of the advertising vehicle associated with each of the available mobile advertisements. The requested advertisement location field 920 is configured to notify the driver of the advertising vehicle of a requested location for an advertisement to be displayed on the advertising vehicle. In a situation where the driver of the advertising vehicle has access to multiple different mobile advertisements, the requested advertisement location field 920 is usable to notify the driver of the advertising vehicle preferred locations for each of the mobile advertisements based on information from the customers, e.g., customers 190 (FIG. 1). In some embodiments, the requested advertisement location field 920 includes information about fees payable to the driver or operator of the advertising vehicle associated with each of the available mobile advertisements at different locations on the advertising vehicle. In some embodiments, the advertisement placement UI 910 is able to receive input from the driver to confirm or deny the requested advertisement type or advertisement location. In some embodiments, the advertisement placement UI 910 includes a touchscreen.

FIG. 9 includes the navigation UI 905 as being separate from the advertisement placement UI 910. In some embodiments, the advertisement placement UI 910 is overlaid on the navigation UI 905. In some embodiments, the advertisement placement UI 910 is hidden once the advertising vehicle is in motion.

Figure 10:
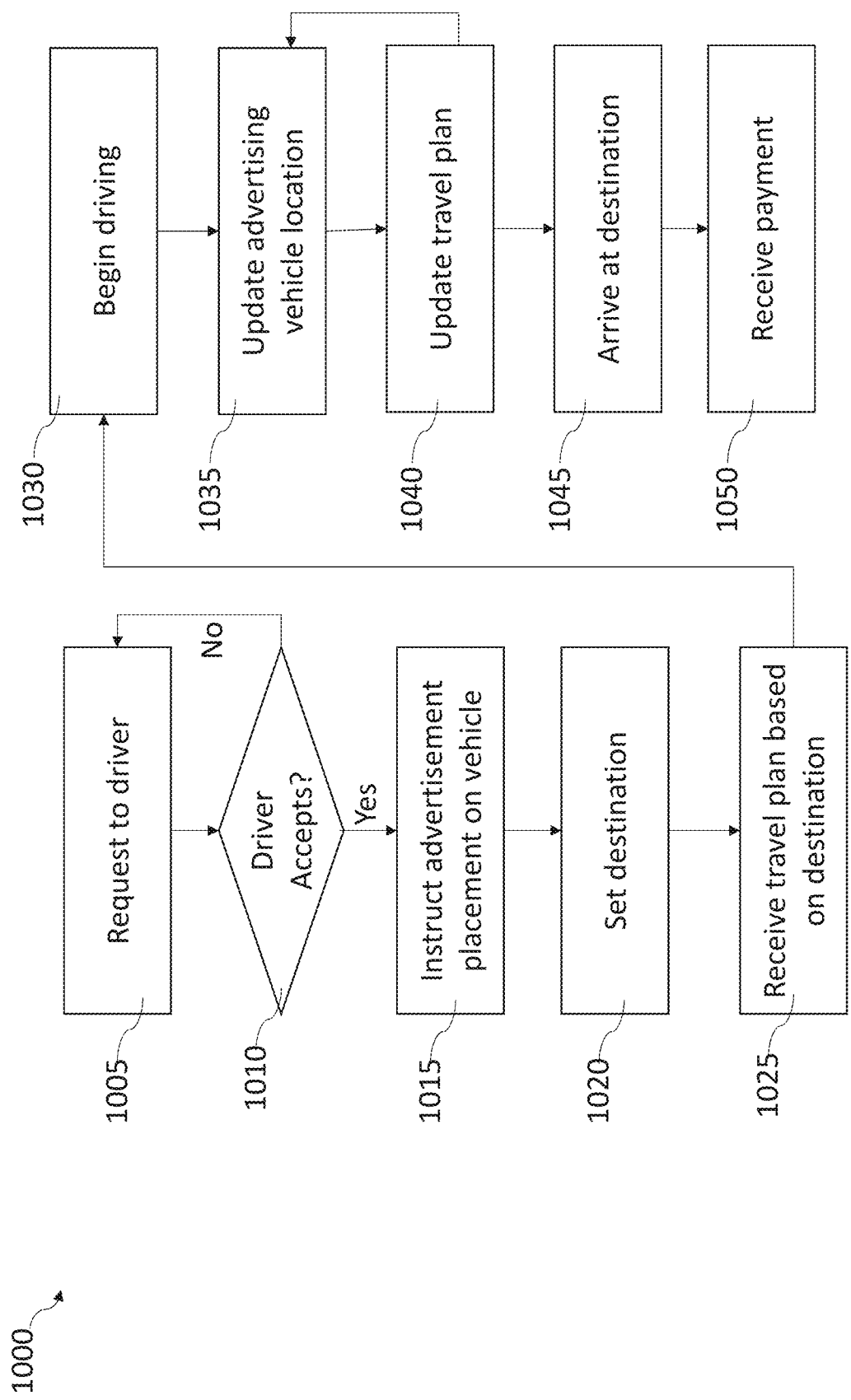
FIG. 10 is a flowchart of a method of navigation for an advertising vehicle, in accordance with some embodiments.

FIG. 10 is a flowchart of a method 1000 of navigation for an advertising vehicle, in accordance with some embodiments. In some embodiments, the method 1000 is implemented using mobile advertising system 100 (FIG. 1). In some embodiments, the method 1000 is implemented using the system 1200 (FIG. 12).

In operation 1005, a request is provided to the driver of the advertising vehicle. The request includes a requested travel plan for driving an advertising vehicle. In some embodiments, the request further includes a request for which mobile advertisement to display on the advertising vehicle. In some embodiments, the request is communicated to the driver using a UI, such as UI 158 (FIG. 1). The request is received from an external device. In some embodiments, the request is received from advertisement advisor 144 (FIG. 1). In some embodiments, the request is received wirelessly. In some embodiments, the request is received via a wired connection.

In operation 1010, a determination is made regarding whether the driver accepts the received request. The determination is made based on a received input from the driver. In some embodiments, the input is received using the UI, such as UI 158 (FIG. 1). In some embodiments, the input is received from a separate device from the UI. In response to a determination that the driver does not accept the request, the method 1000 returns to operation 1005 and waits for a new request to the driver. In some embodiments, the driver is able to input a recommendation for an additional request. In response to a determination that the driver accepts the request, the method 1000 proceeds to operation 1015.

In operation 1015, the driver receives an instruction for which mobile advertisement to attach to the advertising vehicle. In some embodiments, the instruction also includes a location for placement of the mobile advertisement on the advertising vehicle. In some embodiments where the driver has access to multiple mobile advertisements, the instruction includes request for locations for more than one of the mobile advertisements.

In operation 1020, a destination is set by the driver. In some embodiments, the destination is set independent of a request from advertisers that sent the request for operation 1005. In some embodiments, the destination is set in consideration of a request from advertisers. In some embodiments, the destination is set based on input received from the driver, e.g., by UI 158 (FIG. 1). In some embodiments, the destination is received by a navigation system, e.g., navigation system 156 (FIG. 1). The set destination is transmitted to the server, e.g., the server 130 (FIG. 1).

In operation 1025, a travel plan based on the set destination is received by the advertising vehicle. In some embodiments, the travel plan is received by the travel plan receiver 152 (FIG. 1). The travel plan is determined to take the driver to the set destination and sets a route to the set destination along a path that is predicted to improve effectiveness of the mobile advertisement attached to the advertising vehicle. In some embodiments, the travel plan is determined using the advertisement adviser 144 (FIG. 1). The travel plan is input into the navigation system, e.g., the navigation system 152 (FIG. 1), to direct the driver along the travel path.

In operation 1030, the driver begins driving the advertising vehicle along the travel path based on the received travel plan. In some embodiments where the advertising vehicle has an autonomous driving functionality, the advertising vehicle executes instructions for traveling along the travel path set out by the travel plan.

In operation 1035, the advertising vehicle provides updates to the location and pose of the advertising vehicle. The updates are sent to the sever, e.g., the server 130 (FIG. 1). The server then determines whether to adjust the travel plan based on updated information including traffic information, the updated advertising vehicle location, updated advertisement viewing information, or other suitable information.

In operation 1040, in response to a determination to update the travel plan, the updated travel plan is transmitted to the advertising vehicle, either wirelessly or via a wired connection. The updated travel plan is input into the navigation system, e.g., the navigation system 152 (FIG. 1). In some embodiments, the navigation system is configured to automatically notify the driver of the advertising vehicle of a change to the travel plan. In some embodiments, the driver has an option to approve the updated travel plan or deny the updated travel plan, e.g., using the UI 158 (FIG. 1). In some embodiments, the updated travel plan automatically replaces any existing travel plan.

In operation 1045, the advertising vehicle arrives at the set destination.

In operation 1050, payment for the advertising vehicle traveling along the travel path determined by the travel plan is received by an account of the driver or operator of the advertising vehicle. In some embodiments, the payment is based solely on the travel path taken to reach the destination. In some embodiments, the payment is partially based on a time that the advertising vehicle is parked and a location where the advertising vehicle is parked.

One of ordinary skill in the art would understand that modifications to the method 1000 are within the scope of this description. In some embodiments, additional operations are included in the method 1000. For example, in some embodiments, the method 1000 includes offering multiple travel paths to the set destination for selection by the driver. In some embodiments, at least one operation of the method 1000 is omitted. For example, in some embodiments, the operation 1040 is omitted and the travel path remains unchanged during the trip to the destination. In some embodiments, an order of operations of the method 1000 is adjusted. For example, in some embodiments, the update to the driving begins prior to setting of a destination.

Figure 11:
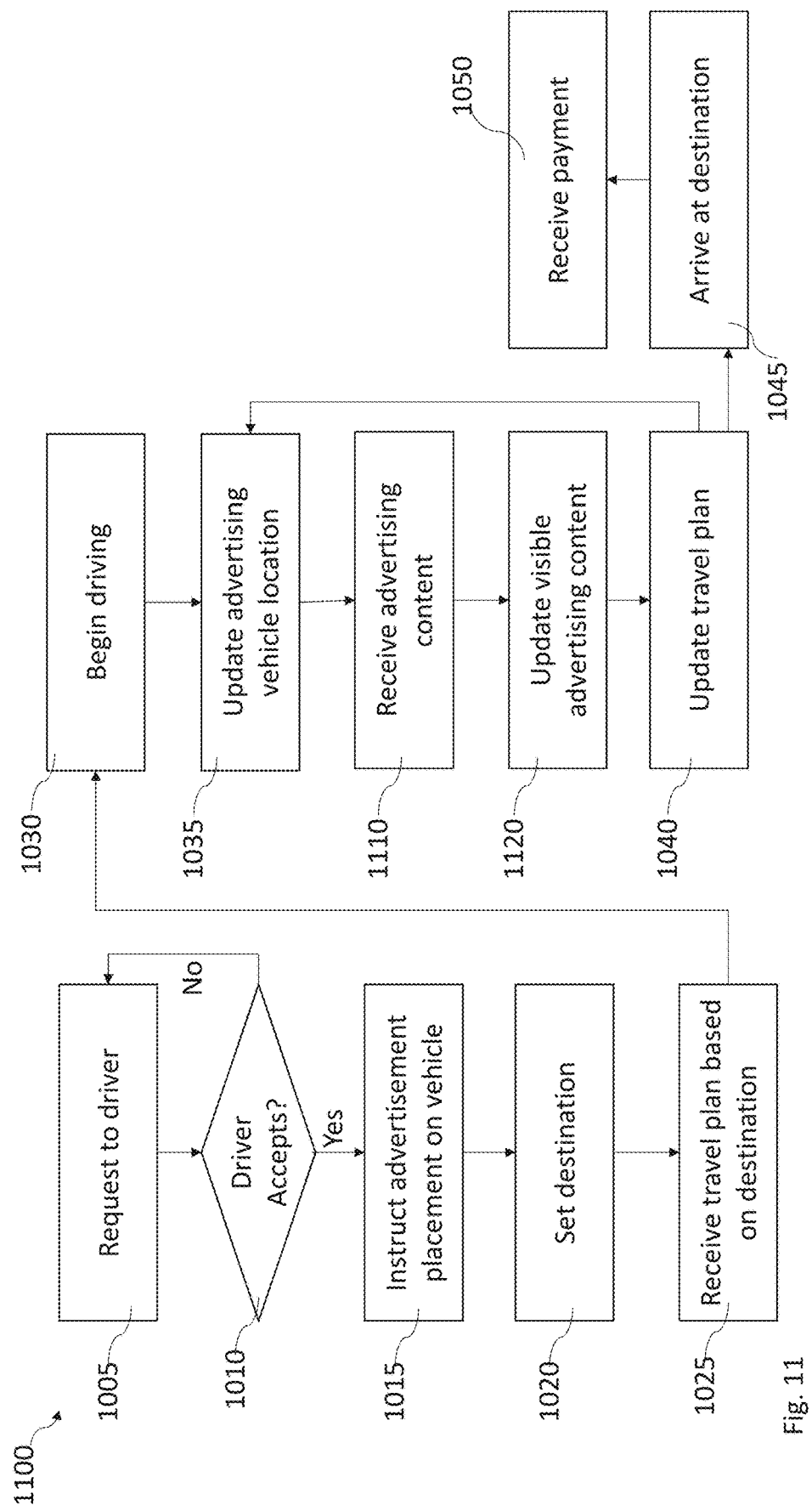
FIG. 11 is a flowchart of a method of navigation for an advertising vehicle, in accordance with some embodiments.

FIG. 11 is a flowchart of a method 1100 of navigation for an advertising vehicle, in accordance with some embodiments. In some embodiments, the method 1100 is implemented using mobile advertising system 100 (FIG. 1). In some embodiments, the method 1100 is implemented using the system 1200 (FIG. 12). The method 1100 is similar to the method 1000 (FIG. 10). Operations having a same reference number are not described in detail for the sake of brevity.

In comparison with method 1000 (FIG. 10), the method 1100 includes operations 1110 and 1120 between operations 1035 and 1040. In operation 1110, the advertising vehicle receives updated requests for advertising content. In operation 1120, the advertising content on the advertising vehicle is updated in response to the received updated request for advertising content. In some embodiments where the mobile advertisement is an adjustable advertisement, the adjustable advertisement is automatically changed in response to the received request to update advertising content. In some embodiments where the mobile advertisement is not an adjustable advertisement, the driver or operator of the advertising vehicle changes the mobile advertisement attached to the advertising vehicle. Inclusion of operations 1110 and 1120 help to improve advertising effectiveness. For example, as the advertising vehicle moves along the travel path, the advertising vehicle will become closer to different businesses. Once the proximity to a different business satisfies a threshold condition, then the request to change the mobile advertisement to the different business is received, in some embodiments.

FIG. 12 is a diagram of a system 1200 for implementing a vehicle advertising system, in accordance with some embodiments. System 1200 includes a hardware processor 1202 and a non-transitory, computer readable storage medium 1204 encoded with, i.e., storing, the computer program code 1206, i.e., a set of executable instructions. Computer readable storage medium 1204 is also encoded with instructions 1207 for interfacing with external devices. The processor 1202 is electrically coupled to the computer readable storage medium 1204 via a bus 1208. The processor 1202 is also electrically coupled to an input/output (I/O) interface 1210 by bus 1208. A network interface 1212 is also electrically connected to the processor 1202 via bus 1208. Network interface 1212 is connected to a network 1214, so that processor 1202 and computer readable storage medium 1204 are capable of connecting to external elements via network 1214. The processor 1202 is configured to execute the computer program code 1206 encoded in the computer readable storage medium 1204 in order to cause system 1200 to be usable for performing a portion or all of the operations as described in mobile advertising system 100 (FIG. 1), method 200 (FIG. 2), method 400 (FIG. 4), method 700 (FIG. 7), method 1000 (FIG. 10), or method 1100 (FIG. 11).

In some embodiments, the processor 1202 is a central processing unit (CPU), a multi-processor, a distributed processing system, an application specific integrated circuit (ASIC), and/or a suitable processing unit.

In some embodiments, the computer readable storage medium 1204 includes an electronic, magnetic, optical, electromagnetic, infrared, and/or a semiconductor system (or apparatus or device). For example, the computer readable storage medium 1204 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 1204 includes a compact disk-read only memory (CD-ROM), a compact disk-read/write (CD-R/W), and/or a digital video disc (DVD).

In some embodiments, the storage medium 1204 stores the computer program code 1206 configured to cause system 1200 to perform a portion or all of the operations as described in mobile advertising system 100 (FIG. 1), method 200 (FIG. 2), method 400 (FIG. 4), method 700 (FIG. 7), method 1000 (FIG. 10), or method 1100 (FIG. 11). In some embodiments, the storage medium 1204 also stores information needed for performing a portion or all of the operations as described in mobile advertising system 100 (FIG. 1), method 200 (FIG. 2), method 400 (FIG. 4), method 700 (FIG. 7), method 1000 (FIG. 10), or method 1100 (FIG. 11) as well as information generated during performing a portion or all of the operations as described in mobile advertising system 100 (FIG. 1), method 200 (FIG. 2), method 400 (FIG. 4), method 700 (FIG. 7), method 1000 (FIG. 10), or method 1100 (FIG. 11), such as a gaze data parameter 1216, an object data parameter 1218, a vehicle position parameter 1220, an advertising content parameter 1222, and/or a set of executable instructions to perform a portion or all of the operations as described in mobile advertising system 100 (FIG. 1), method 200 (FIG. 2), method 400 (FIG. 4), method 700 (FIG. 7), method 1000 (FIG. 10), or method 1100 (FIG. 11).

In some embodiments, the storage medium 1204 stores instructions 1207 for interfacing with external devices. The instructions 1207 enable processor 1202 to generate instructions readable by the external devices to effectively implement a portion or all of the operations as described in mobile advertising system 100 (FIG. 1), method 200 (FIG. 2), method 400 (FIG. 4), method 700 (FIG. 7), method 1000 (FIG. 10), or method 1100 (FIG. 11).

System 1200 includes I/O interface 1210. I/O interface 1210 is coupled to external circuitry. In some embodiments, I/O interface 1210 includes a keyboard, keypad, mouse, trackball, trackpad, and/or cursor direction keys for communicating information and commands to processor 1202.

System 1200 also includes network interface 1212 coupled to the processor 1202. Network interface 1212 allows system 1200 to communicate with network 1214, to which one or more other computer systems are connected. Network interface 1212 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in mobile advertising system 100 (FIG. 1), method 200 (FIG. 2), method 400 (FIG. 4), method 700 (FIG. 7), method 1000 (FIG. 10), or method 1100 (FIG. 11) is implemented in two or more systems 1200, and information such as gaze data parameter 1216, object data parameter 1218, vehicle location parameter 1220, or advertising content parameter 1222 are exchanged between different systems 1200 via network 1214.

An aspect of this description relates to a mobile advertising system. The mobile advertising system includes a non-transitory computer readable configured to store instructions thereon; and a processor connected to the non-transitory computer readable medium. The processor is configured to execute the instructions for receiving gaze data from a viewing vehicle. The processor is further configured to execute the instructions for receiving location information from an advertising vehicle. The processor is further configured to execute the instructions for correlating the gaze data with the location information to determine whether the gaze data indicates viewing of an advertisement attached to the advertising vehicle. The processor is further configured to execute the instructions for updating a histogram based on the correlation between the gaze data and the location information. The processor is further configured to execute the instructions for generating a travel plan for increasing advertising effectiveness for the advertisement. The processor is further configured to execute the instructions for transmitting the travel plan to the advertising vehicle. In some embodiments, the processor is further configured to execute the instructions for determining an effectiveness of the advertisement based on the histogram; and generating payment instructions based on the determined effectiveness of the advertisement. In some embodiments, the processor is further configured to execute the instructions for updating the histogram based on demographic information for an occupant of the viewing vehicle associated with the gaze data. In some embodiments, the processor is further configured to execute the instructions for receiving information related to a content of the advertisement from the advertising vehicle. In some embodiments, the processor is further configured to execute the instructions for determining which advertisement of a plurality of advertisements attached to the advertising vehicle was viewed based on the gaze data. In some embodiments, the processor is further configured to execute the instructions for determining an area of the advertising vehicle viewed based on the gaze data. In some embodiments, the processor is further configured to execute the instructions for determining a duration the advertisement was viewed based on the gaze data. In some embodiments, the processor is further configured to execute the instructions for generating recommendations for increasing effectiveness of the advertisement based on the histogram.

An aspect of this description relates to a mobile advertising method. The method includes receiving gaze data from a viewing vehicle. The method further includes receiving location information from an advertising vehicle. The method further includes correlating the gaze data with the location information to determine whether the gaze data indicates viewing of an advertisement attached to the advertising vehicle. The method further includes updating a histogram based on the correlation between the gaze data and the location information. The method further includes generating a travel plan for increasing advertising effectiveness for the advertisement. The method further includes transmitting the travel plan to the advertising vehicle. In some embodiments, the method further includes determining an effectiveness of the advertisement based on the histogram; and generating payment instructions based on the determined effectiveness of the advertisement. In some embodiments, updating the histogram includes updating the histogram based on demographic information for an occupant of the viewing vehicle associated with the gaze data. In some embodiments, the method further includes receiving information related to a content of the advertisement from the advertising vehicle. In some embodiments, the method further includes determining which advertisement of a plurality of advertisements attached to the advertising vehicle was viewed based on the gaze data. In some embodiments, the method further includes determining an area of the advertising vehicle viewed based on the gaze data. In some embodiments, the method further includes determining a duration the advertisement was viewed based on the gaze data. In some embodiments, the method further includes generating recommendations for increasing effectiveness of the advertisement based on the histogram.

An aspect of this description relates to a mobile advertising system. The mobile advertisement system includes an advertising vehicle system configured to determine location information for an advertising vehicle. The mobile advertisement system includes a viewing vehicle system configured to determine gaze data associated with an occupant of a viewing vehicle. The mobile advertisement system further includes a server capable of communicating with the advertising vehicle system and the viewing vehicle system. The server includes a non-transitory computer readable configured to store instructions thereon; and a processor connected to the non-transitory computer readable medium. The processor is configured to execute the instructions for receiving the gaze data from the viewing vehicle system. The processor is further configured to execute the instructions for receiving the location information from the advertising vehicle system. The processor is further configured to execute the instructions for correlating the gaze data with the location information to determine whether the gaze data indicates viewing of an advertisement attached to the advertising vehicle. The processor is further configured to execute the instructions for updating a histogram based on the correlation between the gaze data and the location information. The processor is further configured to execute the instructions for generating a travel plan for increasing advertising effectiveness for the advertisement. The processor is further configured to execute the instructions for transmitting the travel plan to the advertising vehicle system. In some embodiments, the advertising vehicle system is configured to update a navigation system in response to receiving the travel plan from the server. In some embodiments, the processor is configured to execute the instructions for generating a request to update a content of the advertisement based on the histogram; and transmitting the request to the advertising vehicle system. In some embodiments, the advertising vehicle system is configured to automatically update the content of the advertisement in response to receipt of the request to update the content of the advertisement.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A mobile advertising system, comprising:
    a non-transitory computer readable medium configured to store instructions and a histogram thereon; and
    a processor connected to the non-transitory computer readable medium, wherein the processor is configured to execute the instructions for:
        receiving gaze data captured by an occupant monitoring camera mounted in a viewing vehicle;
        receiving location information collected by a global positioning system (GPS) in an advertising vehicle;
        correlating the gaze data with the location information to determine whether the gaze data indicates viewing of an advertisement attached to the advertising vehicle;
        updating the histogram based on the correlation between the gaze data and the location information;
        generating a travel plan for increasing advertising effectiveness for the advertisement based on the updated histogram; and
        transmitting the travel plan to the advertising vehicle.

2. The mobile advertising system according to claim 1, wherein the processor is further configured to execute the instructions for:
    determining an effectiveness of the advertisement based on the histogram; and
    generating payment instructions based on the determined effectiveness of the advertisement.

3. The mobile advertising system according to claim 1, wherein the processor is further configured to execute the instructions for:
    updating the histogram based on demographic information for an occupant of the viewing vehicle associated with the gaze data.

4. The mobile advertising system according to claim 1, wherein the processor is further configured to execute the instructions for:
    receiving information related to a content of the advertisement from the advertising vehicle.

5. The mobile advertising system according to claim 1, wherein the processor is further configured to execute the instructions for:
    determining which advertisement of a plurality of advertisements attached to the advertising vehicle was viewed based on the gaze data.

6. The mobile advertising system according to claim 1, wherein the processor is further configured to execute the instructions for:
    determining an area of the advertising vehicle viewed based on the gaze data.

7. The mobile advertising system according to claim 1, wherein the processor is further configured to execute the instructions for:
    determining a duration the advertisement was viewed based on the gaze data.

8. The mobile advertising system according to claim 1, wherein the processor is further configured to execute the instructions for:
   generating recommendations for increasing effectiveness of the advertisement based on the histogram.

9. A mobile advertising method, the method comprising:
   receiving gaze data captured by an occupant monitoring camera mounted in a viewing vehicle;
   receiving location information collected by a global positioning system (GPS) in an advertising vehicle;
   correlating, using a processor, the gaze data with the location information to determine whether the gaze data indicates viewing of an advertisement attached to the advertising vehicle;
   retrieving, using the processor, a histogram from a non-transitory computer readable medium;
   updating, using the processor, the histogram based on the correlation between the gaze data and the location information;
   generating, using the processor, a travel plan for increasing advertising effectiveness for the advertisement based on the updated histogram; and
   transmitting, using a transmitter, the travel plan to the advertising vehicle.

10. The method according to claim 9, further comprising:
    determining an effectiveness of the advertisement based on the histogram; and
    generating payment instructions based on the determined effectiveness of the advertisement.

11. The method according to claim 9, wherein updating the histogram comprises updating the histogram based on demographic information for an occupant of the viewing vehicle associated with the gaze data.

12. The method according to claim 9, further comprising:
    receiving information related to a content of the advertisement from the advertising vehicle.

13. The method according to claim 9, further comprising:
    determining which advertisement of a plurality of advertisements attached to the advertising vehicle was viewed based on the gaze data.

14. The method according to claim 9, further comprising:
    determining an area of the advertising vehicle viewed based on the gaze data.

15. The method according to claim 9, further comprising:
    determining a duration the advertisement was viewed based on the gaze data.

16. The method according to claim 9, further comprising:
    generating recommendations for increasing effectiveness of the advertisement based on the histogram.

17. A mobile advertising system, comprising:
    an advertising vehicle system configured to determine location information for an advertising vehicle, wherein the advertising vehicle system comprises a global positioning system (GPS);
    a viewing vehicle system configured to determine gaze data associated with an occupant of a viewing vehicle, wherein the viewing vehicle system comprises an occupant monitoring camera; and
    a server capable of communicating with the advertising vehicle system and the viewing vehicle system, wherein the server comprises:
       a non-transitory computer readable medium configured to store instructions and a histogram thereon; and
       a processor connected to the non-transitory computer readable medium, wherein the processor is configured to execute the instructions for:
          receiving the gaze data captured by the occupant monitoring camera in the viewing vehicle system;
          receiving the location information collected by the GPS in the advertising vehicle system;
          correlating the gaze data with the location information to determine whether the gaze data indicates viewing of an advertisement attached to the advertising vehicle;
          updating the histogram based on the correlation between the gaze data and the location information;
          generating a travel plan for increasing advertising effectiveness for the advertisement based on the updated histogram; and
          transmitting the travel plan to the advertising vehicle system.

18. The mobile advertising system according to claim 17, wherein the advertising vehicle system is configured to update a navigation system in response to receiving the travel plan from the server.

19. The mobile advertising system according to claim 17, wherein the processor is configured to execute the instructions for:
    generating a request to update a content of the advertisement based on the histogram; and
    transmitting the request to the advertising vehicle system.

20. The mobile advertising system according to claim 19, wherein the advertising vehicle system is configured to automatically update the content of the advertisement in response to receipt of the request to update the content of the advertisement.

* * * * *